US012165568B2

(12) United States Patent
Hwang et al.

(10) Patent No.: US 12,165,568 B2
(45) Date of Patent: Dec. 10, 2024

(54) DISPLAY DEVICE

(71) Applicant: SAMSUNG DISPLAY CO., LTD., Yongin-si (KR)

(72) Inventors: Jung Hwan Hwang, Seongnam-si (KR); Hyun Joon Kim, Hwaseong-si (KR); Kye Uk Lee, Seoul (KR); Sang Jin Jeon, Hwaseong-si (KR); Jun Ki Jeong, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/353,817

(22) Filed: Jul. 17, 2023

(65) Prior Publication Data

US 2023/0360584 A1 Nov. 9, 2023

Related U.S. Application Data

(62) Division of application No. 17/849,277, filed on Jun. 24, 2022, now Pat. No. 11,705,051.

(30) Foreign Application Priority Data

Oct. 14, 2021 (KR) ........................ 10-2021-0136754

(51) Int. Cl.
*G09G 3/22* (2006.01)
*G09G 3/3208* (2016.01)
(Continued)

(52) U.S. Cl.
CPC ............. *G09G 3/22* (2013.01); *G09G 3/3208* (2013.01); *G09G 3/3233* (2013.01);
(Continued)

(58) Field of Classification Search
CPC ...... G09G 3/22; G09G 3/3208; G09G 3/3233; G09G 3/3241; G09G 3/3648;
(Continued)

(56) References Cited

U.S. PATENT DOCUMENTS 11,398,181 B2 * 7/2022 Kim .......................... G09G 3/32
11,495,171 B2 * 11/2022 Kim ..................... H05B 45/325
(Continued)

FOREIGN PATENT DOCUMENTS

EP 3839934 A1 6/2021
KR 2020-0101605 A 8/2020
KR 2020-0114980 A 10/2020

OTHER PUBLICATIONS

EPO Extended European Search Report dated Mar. 29, 2023, issued in corresponding European Patent Application No. 22194024.0 (11 pages).

*Primary Examiner* — Mihir K Rayan
(74) *Attorney, Agent, or Firm* — Lewis Roca Rothgerber Christie LLP

(57) ABSTRACT

A display device includes a first pixel driver connected to a sweep line, the first pixel driver generating a control current based on a first data voltage, a second pixel driver connected to a scan control line, the second pixel driver generating a driving current based on a second data voltage and controlling a period for which the driving current flows, based on the control current, and a light-emitting element connected to the second pixel driver to receive the driving current. The first pixel driver includes a first transistor generating the control current based on the first data voltage, a second transistor providing the first data voltage to a first electrode of the first transistor based on a scan write signal, and a first capacitor including a first capacitor electrode connected to a gate electrode of the first transistor, and a second capacitor electrode connected to the sweep line.

14 Claims, 22 Drawing Sheets

(51) Int. Cl.
*G09G 3/3233* (2016.01)
*G09G 3/3241* (2016.01)
*G09G 3/36* (2006.01)

(52) U.S. Cl.
CPC ......... *G09G 3/3241* (2013.01); *G09G 3/3648* (2013.01); *G09G 2330/025* (2013.01); *G09G 2330/028* (2013.01)

(58) Field of Classification Search
CPC ....... G09G 2330/025; G09G 2330/028; G09G 2300/0426; G09G 2300/0852; G09G 2300/0861; G09G 2310/0259; G09G 2310/066; G09G 3/32; G09G 3/2081; G09G 5/003; G09G 2310/0202; G09G 2310/0267; G09G 2310/0275
See application file for complete search history.

(56) References Cited

U.S. PATENT DOCUMENTS

| | | | | |
|---|---|---|---|---|
| 2009/0021536 | A1 | 1/2009 | Abe et al. | |
| 2009/0167649 | A1 | 7/2009 | Ishizuka | |
| 2018/0301080 | A1* | 10/2018 | Shigeta | G09G 3/32 |
| 2019/0371231 | A1* | 12/2019 | Kim | G09G 3/2003 |
| 2020/0111403 | A1 | 4/2020 | Kim et al. | |
| 2020/0111404 | A1* | 4/2020 | Kim | G09G 3/2011 |
| 2020/0312229 | A1 | 10/2020 | Kim et al. | |
| 2020/0365078 | A1 | 11/2020 | Zhai et al. | |
| 2020/0394953 | A1 | 12/2020 | Kim et al. | |
| 2022/0101783 | A1 | 3/2022 | Han et al. | |

* cited by examiner

DISPLAY DEVICE

CROSS-REFERENCE TO RELATED APPLICATIONS

This application is a divisional of U.S. patent application Ser. No. 17/849,277, filed Jun. 24, 2022, which claims priority to and the benefit of Korean Patent Application No. 10-2021-0136754, filed Oct. 14, 2021, the entire content of both of which is incorporated herein by reference.

BACKGROUND

1. Field

The present disclosure relates to a display device.

2. Description of the Related Art

As the information society has developed, the demand for display devices for displaying images has increased. Examples of such display devices include flat panel display devices such as a liquid crystal display (LCD) device, a field emission display (FED) device, or an organic light-emitting diode (OLED) display device.

Meanwhile, examples of light-emitting display devices include an OLED display device including OLEDs and an inorganic light-emitting diode (LED) display device including inorganic LEDs. The OLED display device can control the luminance or grayscale level of light emitted from the OLEDs by controlling the magnitude of a driving current applied to the OLEDs. As the wavelength of light emitted from inorganic LEDs varies depending on a driving current applied to the inorganic LEDs, the quality of an image may deteriorate if the inorganic LEDs are driven in the same manner as OLEDs.

SUMMARY

Aspects of one or more embodiments of the present disclosure are directed to a display device capable of minimizing or reducing luminance deviations (or variations) and improving the quality of an image by controlling a driving current applied to inorganic light-emitting diodes (LEDs).

However, embodiments of the present disclosure are not restricted to those set forth herein. The above and other embodiments of the present disclosure will become more apparent to one of ordinary skill in the art to which the present disclosure pertains by referencing the detailed description of the present disclosure given below.

According to one or more embodiments of the present disclosure, a display device includes a first pixel driver connected to a scan write line, a sweep line, and a first data line, the first pixel driver to generate a control current based on a first data voltage received from the first data line, a second pixel driver connected to a scan control line and a second data line, the second pixel driver to generate a driving current based on a second data voltage received from the second data line and to control a period for which the driving current flows, based on the control current, and a light-emitting element connected to the second pixel driver to receive the driving current. The first pixel driver includes a first transistor to generate the control current based on the first data voltage, a second transistor to provide the first data voltage to a first electrode of the first transistor based on a scan write signal received from the scan write line, and a first capacitor including a first capacitor electrode connected to a gate electrode of the first transistor, and a second capacitor electrode connected to the sweep line. The second pixel driver includes a third transistor to generate the driving current based on the control current, and a fourth transistor to provide the second data voltage to a first electrode of the third transistor based on a scan control signal received from the scan control line.

A sweep signal to be applied from the sweep line may have a pulse that linearly decreases from a gate-off voltage to a gate-on voltage.

The display device may further include a start scan initialization line and an initialization voltage line connected to the first pixel driver. The first pixel driver may further include a fifth transistor electrically connecting a second electrode of the first transistor and the gate electrode of the first transistor based on the scan write signal, and a sixth transistor electrically connecting the gate electrode of the first transistor and the initialization voltage line based on a start scan initialization signal received from the start scan initialization line.

The fifth transistor may include a plurality of transistors connected in series between the second electrode of the first transistor and the gate electrode of the first transistor.

The sixth transistor may include a plurality of transistors connected in series between the gate electrode of the first transistor and the initialization voltage line.

The display device may further include a pulse width modulation (PWM) emission line and a first power supply line connected to the first pixel driver. The first pixel driver may include a seventh transistor electrically connecting the first power supply line and the first electrode of the first transistor based on a PWM emission signal received from the PWM emission line, and an eighth transistor electrically connecting the second electrode of the first transistor and a gate electrode of the third transistor based on the PWM emission signal.

The display device may further include a repeat scan initialization line and a gate-off voltage line connected to the first pixel driver. The first pixel driver may further include a ninth transistor electrically connecting the gate-off voltage line and the second capacitor electrode based on a repeat scan initialization signal received from the repeat scan initialization line.

The display device may further include a repeat scan initialization line and an initialization voltage line connected to the second pixel driver. The second pixel driver may further include a tenth transistor electrically connecting a second electrode of the third transistor and a gate electrode of the third transistor based on the scan control signal, and an eleventh transistor electrically connecting the gate electrode of the third transistor and the initialization voltage line based on a repeat scan initialization signal received from the repeat scan initialization line.

The tenth transistor may include a plurality of transistors connected in series between the second electrode of the third transistor and the gate electrode of the third transistor.

The eleventh transistor may include a plurality of transistors connected in series between the gate electrode of the third transistor and the initialization voltage line.

The display device may further include a first power supply line connected to the second pixel driver. The second pixel driver may further include a twelfth transistor turned on based on the repeat scan initialization signal and having a first electrode connected to the first power supply line, and a second capacitor including a first capacitor electrode connected to the gate electrode of the third transistor and a second capacitor electrode connected to a second electrode of the twelfth transistor.

The display device may further include a PWM emission line and a second power supply line connected to the second pixel driver. The second pixel driver may further include a thirteenth transistor electrically connecting the second power supply line and the second capacitor electrode of the second capacitor based on a PWM emission signal received from the PWM emission line.

The display device may further include a pulse amplitude modulation (PAM) emission line connected to the second pixel driver. The second pixel driver may further include a fourteenth transistor electrically connecting the second power supply line and the first electrode of the third transistor based on the PWM emission signal, and a fifteenth transistor electrically connecting the second electrode of the third transistor and a first electrode of the light-emitting element based on a PAM emission signal received from the PAM emission line.

The second pixel driver may further include a sixteenth transistor electrically connecting the first electrode of the light-emitting element and the initialization voltage line based on the repeat scan initialization signal.

According to one or more embodiments of the present disclosure, a display device includes a first pixel driver connected to a start scan initialization line, a repeat scan initialization line, a scan write line, a sweep line, an initialization voltage line, a gate-off voltage line, and a first data line, the first pixel driver to generate a control current based on a first data voltage received from the first data line, a second pixel driver connected to a scan control line and a second data line, the second pixel driver to generate a driving current based on a second data voltage received from the second data line and to control a period for which the driving current flows, based on the control current, and a light-emitting element connected to the second pixel driver to receive the driving current. The first pixel driver includes a first transistor to generate the control current based on the first data voltage, a second transistor to provide the first data voltage to a first electrode of the first transistor based on a scan write signal received from the scan write line, a third transistor electrically connecting a gate electrode of the first transistor and the initialization voltage line based on a start scan initialization signal received from the start scan initialization line, a first capacitor including a first capacitor electrode connected to the gate electrode of the first transistor, and a second capacitor electrode connected to the sweep line, and a fourth transistor electrically connecting the gate-off voltage line and the second capacitor electrode of the first capacitor based on a repeat scan initialization signal received from the repeat scan initialization line. The start scan initialization signal may be generated one time during one frame. The repeat scan initialization signal may be generated as many times as there are emission periods in one frame.

The second pixel driver may further include a fifth transistor to generate the driving current based on the control current, and a sixth transistor to provide the second data voltage to a first electrode of the fifth transistor based on a scan control signal received from the scan control line.

The scan write signal may be generated one time during one frame. The scan control signal may be generated as many times as there are emission periods in one frame.

A sweep signal to be applied from the sweep line repeatedly may have a pulse that linearly decreases from a gate-off voltage to a gate-on voltage, during each emission period of one frame.

According to one or more embodiments of the present disclosure, a display device includes a substrate, an active layer including a first channel, a first source electrode, and a first drain electrode, which are on the substrate, a first capacitor electrode on the active layer, the first capacitor electrode overlapping the first channel, a second capacitor electrode overlapping the first capacitor electrode, a sweep line on the second capacitor electrode to provide a sweep signal, a second source electrode connected to the first drain electrode, a second channel adjacent to the second source electrode, a second drain electrode adjacent to the second channel, a connecting electrode at a same layer as the sweep line and connected to the second drain electrode, a third capacitor electrode at a same layer as the first capacitor electrode and connected to the connecting electrode, and a fourth capacitor electrode at a the same layer as the second capacitor electrode, the fourth capacitor electrode overlapping the third capacitor electrode.

The sweep signal may have a pulse that linearly decreases from a gate-off voltage to a gate-on voltage.

The display device may further include a third drain electrode connected to the first source electrode, a third channel adjacent to the third drain electrode, a third source electrode adjacent to the third channel, and a first data line on the sweep line and electrically connected to the third source electrode to provide a first data voltage.

The display device may further include a fourth channel overlapping the third capacitor electrode, a fourth source electrode on a side of the fourth channel, a fourth drain electrode on another side of the fourth channel, a fifth drain electrode connected to the fourth source electrode, a fifth channel adjacent to the fifth drain electrode, a fifth source electrode adjacent to the fifth channel, and a second data line at a same layer as the first data line and electrically connected to the fifth source electrode to provide a second data voltage.

According to one or more embodiments of the present disclosure, as a control current is applied to the gate electrodes of transistors having an amplitude distribution, a duty distribution and the amplitude distribution can both be prevented or substantially prevented from being caused in one transistor, and luminance deviations (or variations) can be minimized or reduced by improving the margin for the threshold voltage distribution of transistors.

Other features and embodiments may be apparent from the following detailed description, the drawings, and the claims.

BRIEF DESCRIPTION OF THE DRAWINGS

The above and other embodiments and features of the present disclosure will become more apparent by describing in more detail embodiments thereof with reference to the attached drawings, in which.

DETAILED DESCRIPTION

Figure 1:
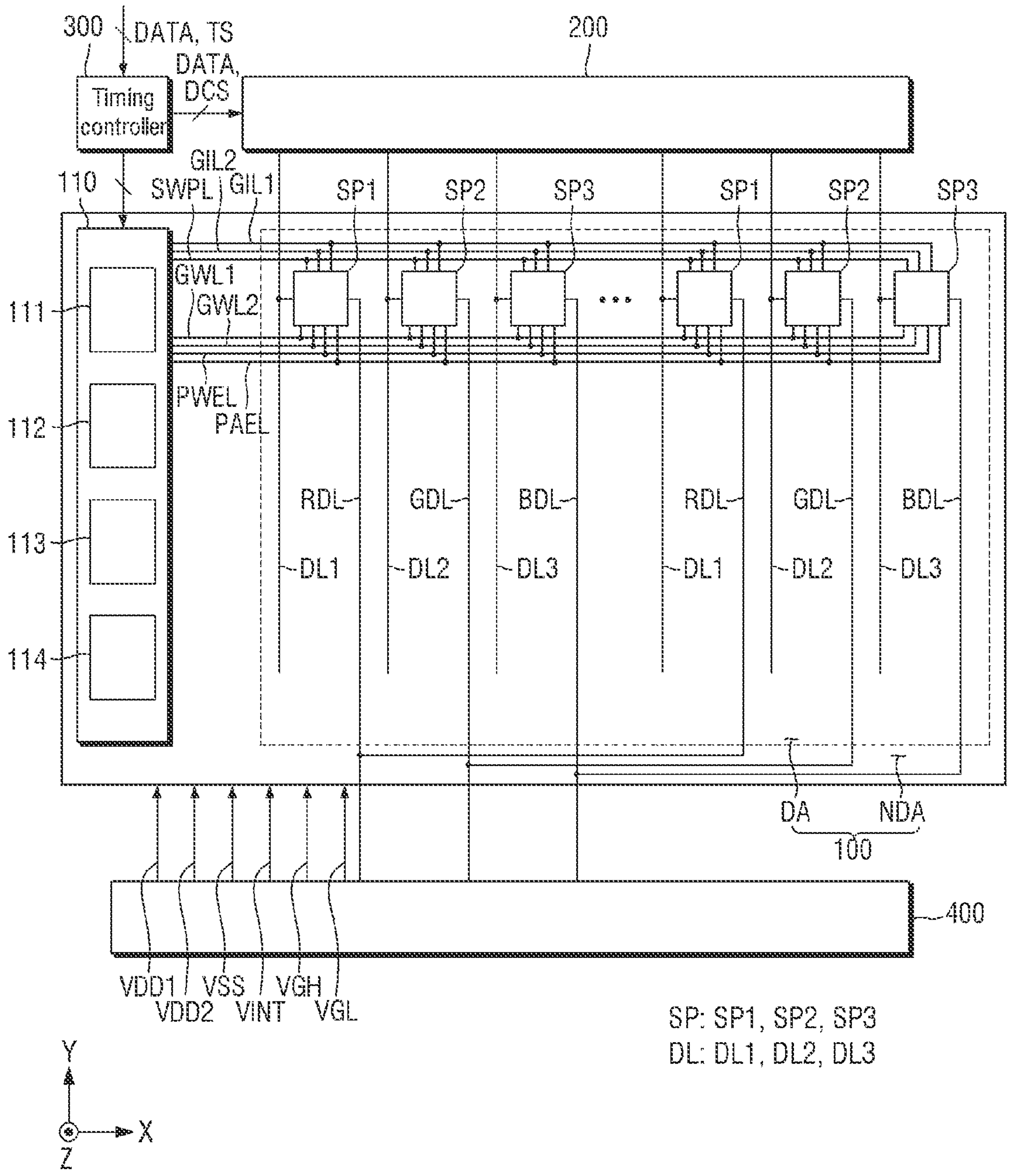
FIG. 1 is a block diagram of a display device according to one or more embodiments of the present disclosure.

In the following description, for the purposes of explanation, numerous specific details are set forth in order to provide a thorough understanding of various embodiments or implementations of the present disclosure. As used herein "embodiments" and "implementations" are interchangeable words that are non-limiting examples of devices or methods employing one or more of the present disclosure disclosed herein. It is apparent, however, that various embodiments may be practiced without these specific details or with one or more equivalent arrangements. In other instances, well-known structures and devices may be shown in block diagram form in order to avoid unnecessarily obscuring various embodiments. Further, various embodiments may be different from each other, but not mutually exclusive. For example, specific shapes, configurations, and characteristics of one or more embodiments may be used or implemented in other embodiments without departing from the spirit and scope of the present disclosure.

Unless otherwise specified, the illustrated embodiments are to be understood as providing features of varying detail of some ways in which the present disclosure may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the spirit and scope of the present disclosure.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified.

Further, in the accompanying drawings, the size and relative sizes of elements may be exaggerated for clarity and/or descriptive purposes. When one or more embodiments may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements.

Further, the X-axis, the Y-axis, and the Z-axis are not limited to three axes of a rectangular coordinate system, and thus the X-, Y-, and Z-axes, and may be interpreted in a broader sense. For example, the X-axis, the Y-axis, and the Z-axis may be perpendicular to one another, or may represent different directions that are not perpendicular to one another.

For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Further, the use of "may" when describing embodiments of the present disclosure refers to "one or more embodiments of the present disclosure."

Although the terms "first," "second," and/or the like may be used herein to describe one or more suitable types of elements, these elements should not be limited by these terms. These terms are used to distinguish one element from another element. Thus, a first element discussed below could be termed a second element without departing from the teachings of the present disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Further-more, the apparatus may be otherwise oriented (e.g., rotated 90 degrees or at other orientations), and, as such, the spatially relative descriptors used herein should be interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation, not as terms of degree, and thus are utilized to account for inherent deviations in measured, calculated, and/or provided values that would be recognized by one of ordinary skill in the art.

Various embodiments are described herein with reference to sectional and/or exploded illustrations that are schematic illustrations of idealized embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature, and the shapes of these regions may not reflect actual shapes of regions of a device and are not necessarily intended to be limiting.

As customary in the field, one or more embodiments are described and illustrated in the accompanying drawings in terms of functional blocks, units, parts, and/or modules. Those skilled in the art will appreciate that these blocks, units, parts, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, parts, and/or modules being implemented by microprocessors or other similar hardware, they may be programmed and controlled using software (e.g., microcode) to perform one or more suitable functions discussed herein and may optionally be driven by firmware and/or software. It is also contemplated that each block, unit, part, and/or module may be implemented by dedicated hardware, or as a combination of dedicated hardware to perform some functions and a processor (e.g., one or more programmed microprocessors and associated circuitry) to perform other functions. Also, each block, unit, part, and/or module of one or more embodiments may be physically separated into two or more interacting and discrete blocks, units, parts, and/or modules without departing from the spirit and scope of the present disclosure. Further, the blocks, units, parts, and/or modules of one or more embodiments may be physically combined into more complex blocks, units, parts, and/or modules without departing from the spirit and scope of the present disclosure.

Unless otherwise defined or implied herein, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and the present disclosure, and should not be interpreted in an ideal or overly formal sense, unless clearly so defined herein.

Hereinafter, detailed embodiments of the present disclosure will be described with reference to the accompanying drawings.

FIG. 1 is a block diagram of a display device according to one or more embodiments of the present disclosure.

Referring to FIG. 1, the display device may include a display panel 100, a gate driver 110, a data driver 200, a timing controller 300, and a power supply 400.

A display area DA of the display panel 100 may include pixels SP, a start scan initialization line GIL1, a repeat scan initialization line GIL2, a scan write line. GWL1, a scan control line GWL2, a sweep line SWPL, a pulse width modulation (PWM) emission line PWEL, a pulse amplitude modulation (PAM) emission line PAEL, data lines DL, first PAM data lines RDL, second PAM data lines GDL, and third PAM data lines BDL.

The start scan initialization line GIL1, the repeat scan initialization line GIL2, the scan write line GWL1, the scan control line GWL2, the sweep line SWPL, the PWM emission line PWEL, and the PAM emission line PAEL may extend in a first direction (or an X-axis direction) and may be spaced from one another in a second direction (or a Y-axis direction). The data lines DL, the first PAM data lines RDL, the second PAM data lines GDL, and the third PAM data lines BDL may extend in the second direction (or the Y-axis direction) and may be spaced from one another in the first direction (or the X-axis direction). The first PAM data lines RDL may be connected (e.g., electrically connected) to each other, the second PAM data lines GDL may be connected (e.g., electrically connected) to each other, and the third PAM data lines BDL may be connected (e.g., electrically connected) to each other.

The pixels SP may include first pixels SP1, which emit first light, second pixels SP2, which emit second light, and third pixels SP3, which emit third light. The first light, the second light, and the third light may correspond to light of a red wavelength range, light of a green wavelength range, and light of a blue wavelength range, respectively, but the present disclosure is not limited thereto. For example, the first light may have a peak wavelength of about 600 nm to about 750 nm, the second light may have a peak wavelength of about 480 nm to about 560 nm, and the third light may have a peak wavelength of about 370 nm to about 460 nm.

The first pixels SP1, the second pixels SP2, and the third pixels SP3 may be connected to the start scan initialization line GIL1, the repeat scan initialization line GIL2, the scan write line GWL1, the scan control line GWL2, the sweep line SWPL, the PAM emission line PWEL, and the PAM emission line PAEL. The first pixels SP1 may also be connected to the data lines DL and the first PAM data lines RDL. The second pixels SP2 may also be connected to the data lines DL and the second PAM data lines GDL. The third pixels SP3 may also be connected to the data lines DL and the third PAM data lines BDL.

A non-display area NDA of the display panel 100 may include the gate driver 110, which provides signals to the start scan initialization line GIL1, the repeat scan initialization line GIL2, the scan write line GWL1, the scan control line GWL2, the sweep line SWPL, the PWM emission line PWEL, and the PAM emission line PAEL.

For example, the gate driver 110 may be disposed along one edge or both edges of the non-display area NDA. In another example, the gate driver 110 may be disposed in the display area DA.

The gate driver 110 may include a first scan signal output unit 111, a second scan signal output unit 112, a sweep signal output unit 113, and an emission signal output unit 114.

The first scan signal output unit 111 may receive a first scan driving control signal from the timing controller 300. The first scan signal output unit 111 may provide a start scan initialization signal to the start scan initialization line GIL1 based on the first scan driving control signal and may provide a repeat scan initialization signal to the repeat scan initialization line GIL2. Thus, the first scan signal output unit 111 may output both the start scan initialization signal and the repeat scan initialization signal together.

The second scan signal output unit 112 may receive a second scan driving control signal from the timing controller 300. The second scan signal output unit 112 may output a scan write signal to the scan write line GWL1 based on the second scan driving control signal and may output a scan control signal to the scan control line GWL2.

The sweep signal output unit 113 may receive a sweep control signal from the timing controller 300. The sweep signal output unit 113 may provide a sweep line to the sweep line SWPL based on the sweep control signal.

The emission signal output unit 114 may receive first and second emission control signals from the timing controller 300. The emission signal output unit 114 may supply a PWM emission signal to the PWM emission line PWEL based on the first emission control signal and may provide a PAM emission signal to the PAM emission line PAEL based on the second emission control signal.

The data driver 200 may receive digital video data DATA and a data control signal DCS from the timing controller 300. The data driver 200 may convert the digital video data DATA into analog data voltages and may supply the analog data voltages to the data lines DL. The first pixels SP1, the second pixels SP2, and the third pixels SP3 may each be selected by a scan write signal from the gate driver 110 and then receive a data voltage.

The timing controller 300 may receive the digital video data DATA and timing signals TS. The timing controller 300 may generate the first and second scan driving control signal, the sweep control signal, and the first and second emission control signals based on the timing signals TS and may thus control the operation timing of the gate driver 110. The timing controller 300 may generate the data control signal DCS and may control the operation timing of the data driver 200. The timing controller 300 may provide the digital video data DATA to the data driver 200.

The power supply 400 may supply a first PAM data voltage in common to the first PAM data lines RDL, a second PAM data voltage in common to the second PAM data lines GDL, and a third PAM data voltage in common to the third PAM data lines BDL. The power supply 400 may generate a plurality of power supply voltages and may provide the power supply voltages to the display panel 100.

The power supply 400 may provide a first power supply voltage VDD1, a second power supply voltage VDD2, a third power supply voltage VSS, an initialization voltage VINT, a gate-on voltage VGL, and a gate-off voltage VGH to the display panel 100. The first and second power supply voltages VDD1 and VDD2 may be high-potential voltages for driving light-emitting elements of the pixels SP. The third power supply voltage VSS may be a low-potential voltage for driving the light-emitting elements of the pixels SP. The initialization voltage VINT and the gate-off voltage VGH may be applied to each of the pixels SP, and the gate-on voltage VGL and the gate-off voltage VGH may be applied to the gate driver 110.

Figure 2:
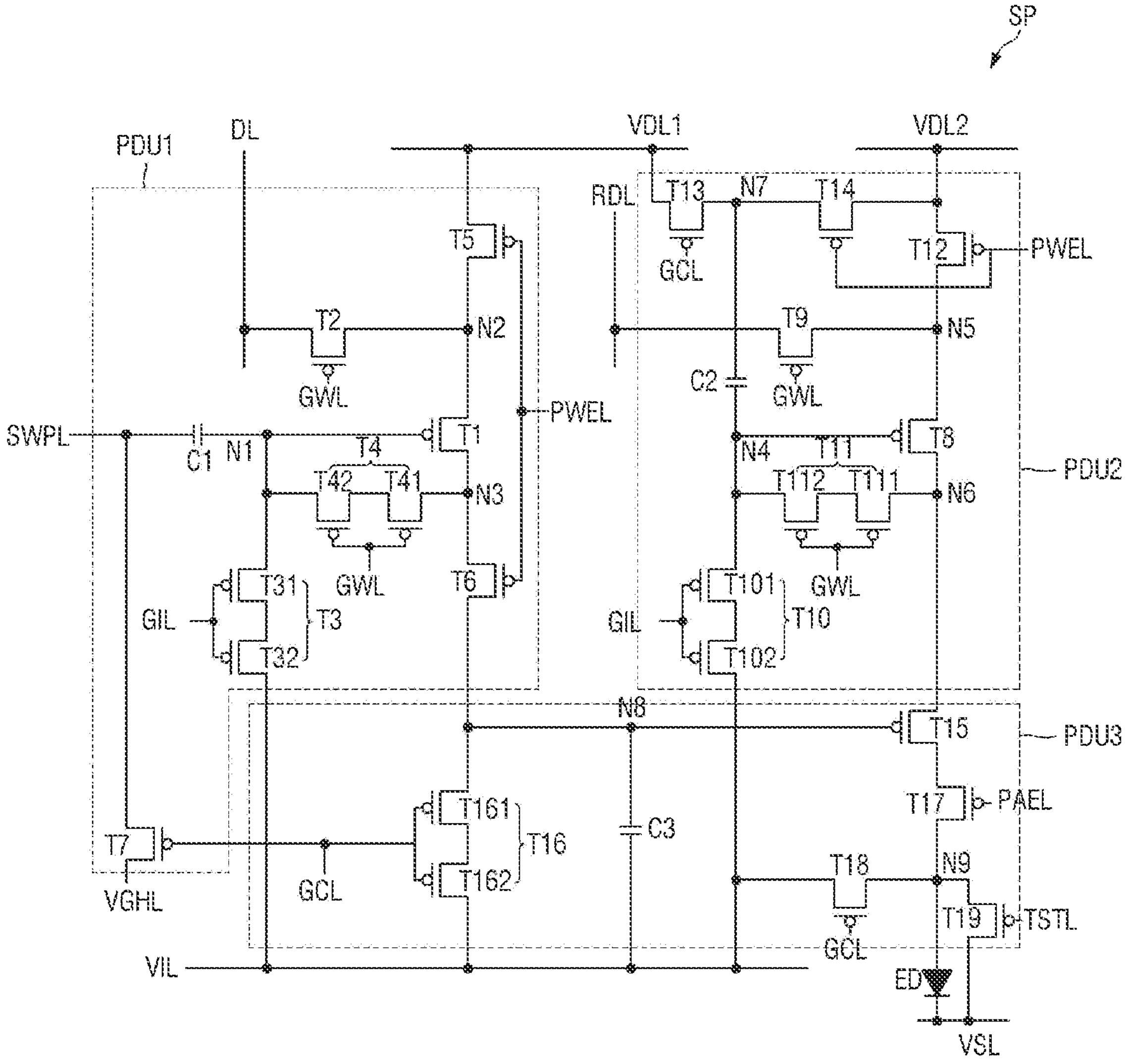
FIG. 2 is a circuit diagram of a pixel of the display device of FIG. 1.

FIG. 2 is a circuit diagram of a pixel of the display device of FIG. 1.

Referring to FIG. 2, a pixel SP may include a first pixel driver PDU1, a second pixel driver PDU2, a third pixel driver PDU3, and a light-emitting element ED. The first pixel driver PDU1 may include first through seventh transistors T1 through T7 and a first capacitor C1.

The first transistor T1 may control a control current, which is provided to an eighth node N8 of the third pixel driver PDU3, based on the voltage of a first node N1, which is the gate electrode of the first transistor T1. The second transistor T2 may be turned on by a scan write signal from a scan write line GWL to provide a data voltage from a data line DL to a second node N2, which is the first electrode of the first transistor T1. The third transistor T3 may be turned on based on a scan initialization signal from a scan initialization line GIL to discharge the first node N1 to the initialization voltage VINT (e.g., the initialization voltage VINT from initialization voltage line VIL). For example, the third transistor T3 may include (3-1)-th and (3-2)-th transistors T31 and T32, which are connected in series. The fourth transistor T4 may be turned on based on the scan write signal from the scan write line GWL to connect (e.g., electrically connect) the first node N1 and a third node N3, which is the second electrode of the first transistor T1. For example, the fourth transistor T4 may include (4-1)-th and (4-2)-th transistors T41 and T42, which are connected in series.

The fifth transistor T5 may be turned on based on a PWM emission signal from a PWM emission line PWEL to connect (e.g., electrically connect) a first power supply line VDL1 and the second node N2. The sixth transistor T6 may be turned on based on the PWM emission signal from the PWM emission line PWEL to connect (e.g., electrically connect) the third node N3 and the eighth node N8 of the third pixel driver PDU3. The seventh transistor T7 may be turned on based on a scan control signal from a scan control line GCL to supply the gate-off voltage VGH (e.g., the gate-off voltage from a gate-off voltage line VGHL) to the second capacitor electrode of the first capacitor C1, which is connected to the sweep line SWPL. The first capacitor C1 may be connected between the first node N1 and the sweep line SWPL.

The second pixel driver PDU2 may include eighth through fourteenth transistors T8 through T14 and a second capacitor C2.

The eighth transistor T8 may control a driving current that flows in the light-emitting element ED, based on the voltage of a fourth node N4, which is the gate electrode of the eighth transistor T8. The ninth transistor T9 may be turned on based on the scan write signal from the scan write line GWL to supply a first PAM data voltage from a first PAM data line RDL to a fifth node N5, which is the first electrode of the eighth transistor T8. The tenth transistor T10 may be turned on based on the scan initialization signal from the scan initialization line GIL to discharge the fourth node N4 to the initialization voltage VINT (e.g., the initialization voltage VINT from the initialization voltage line VIL). For example, the tenth transistor T10 may include (10-1)-th and (10-2)-th transistors T101 and T102, which are connected in series. The eleventh transistor T11 may be turned on based on the scan write signal from the scan write line GWL to connect (e.g., electrically connect) the fourth node N4 and a sixth node N6, which is the second electrode of the eighth transistor T8. For example, the eleventh transistor T11 may include (11-1)-th and (11-2)-th transistors T111 and T112, which are connected in series.

The twelfth transistor T12 may be turned on based on the PWM emission signal from the PWM emission line PWEL to connect (e.g., electrically connect) a second power supply line VDL2 and the fifth node N5. The thirteenth transistor T13 may be turned on based on the scan control signal from the scan control line GCL to connect (e.g., electrically connect) the first power supply line VDL1 and a seventh node N7, which is the second capacitor electrode of the second capacitor C2. The fourteenth transistor T14 may be turned on the PWM emission signal from the PWM emission line PWEL to connect (e.g., electrically connect) the second power supply line VDL2 and the seventh node N7. The second capacitor C2 may be connected between the fourth and seventh nodes N4 and N7.

The third pixel driver PDU3 may include fifteenth through nineteenth transistors T15 through T19 and a third capacitor C3.

The fifteenth transistor T15 may control the period for which the driving current flows, based on a control current received by the eighth node N8, which is the gate electrode of the fifteenth transistor T15. The sixteenth transistor T16 may be turned on based on the scan control signal from the scan control line GCL to discharge the eighth node N8 to the initialization voltage VINT (e.g., the initialization voltage VINT from the initialization voltage line VIL). For example, the sixteenth transistor T16 may include (16-1)-th and (16-2)-th transistors T161 and T162, which are connected in series. The seventh transistor T17 may be turned on based on the PAM emission signal from the PAM emission line PAEL to connect (e.g., electrically connect) the second electrode of the fifteenth transistor T15 and a ninth node N9, which is the first electrode of the light-emitting element ED. The eighteenth transistor T18 may be turned on based on the scan control signal from the scan control line GCL to discharge the ninth node N9 to as low as the initialization voltage VIL (e.g., the initialization voltage VINT from the initialization voltage line VIL). The nineteenth transistor T19 may be turned on based on a test signal from a test signal line TSTL to connect (e.g., electrically connect) the ninth node N9 and a third power supply line VSL. The third capacitor C3 may be connected between the eighth node N8 and an initialization voltage line VIL.

The light-emitting element ED may be connected between the ninth node N9 and the third power supply line VSL.

For example, one of the first and second electrodes of each of the first through nineteenth transistors T1 through T19 may be a source electrode, and the other electrode of each of the first through nineteenth transistors T1 through T19 may be a drain electrode. The first through nineteenth transistors T1 through T19 may be implemented as P-type metal-oxide semiconductor field-effect transistors (MOSFETs), but the present disclosure is not limited thereto. In one or more embodiments, the first through nineteenth transistors T1 through T19 may be implemented as N-type MOSFETs.

The pixel SP may correspond to one of the first pixels SP1 connected to the first PAM data lines RDL. The second pixels SP2 and the third pixels SP3 may have substantially the same circuit structure as the first pixels SP1, except that the second pixels SP2 and the third pixels SP3 are connected to the second PAM data lines GDL and the third PAM data lines BDL, respectively.

Figure 3:
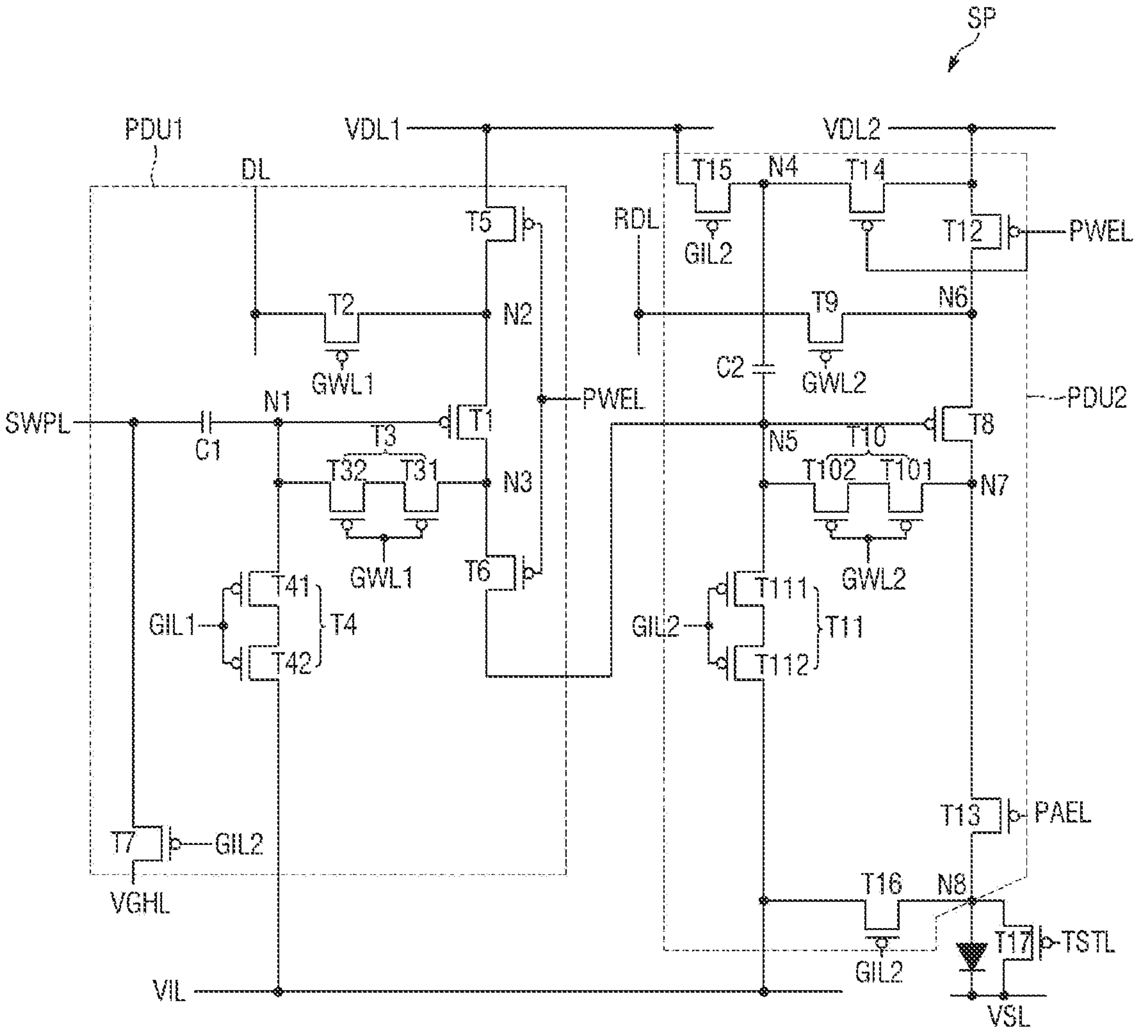
FIG. 3 is a circuit diagram of a pixel of a display device according to another embodiment of the present disclosure.

FIG. 3 is a circuit diagram of a pixel of a display device according to another embodiment of the present disclosure.

Referring to FIG. 3, a pixel SP may be connected to a start scan initialization line GIL1, a repeat scan initialization line GIL2, a scan write line GWL1, a scan control line GWL2, a sweep line SWPL, a PWM emission line PWEL, and a PAM emission line PAEL. A first pixel SP1 may be connected to a data line DL and a first PAM data line RDL. Here, the data line DL may be a first data line, and the first PAM data line RDL may be a second data line. In one or more embodiments, the second data line may be disposed in or at a same layer as the first data line. A data voltage from the data line DL may be a first data voltage, and a first PAM data voltage from the first PAM data line RDL may be a second data voltage. A second pixel SP2 may be connected to a data line DL and a second PAM data line GDL. A third pixel SP3 may be connected to a data line DL and a third PAM data line BDL. The pixel SP may be connected to a first power supply line VDL1, to which a first power supply voltage VDD1 is applied, a second power supply line VDL2, to which a second power supply voltage VDD2 is applied, a third power supply line VSL, to which a third power supply voltage VSS is applied, an initialization voltage line VIL, to which an initialization voltage VINT is applied, and a gate-off voltage line VGHL, to which a gate-off voltage VGH is applied.

The pixel SP may include a first pixel driver PDU1, a second pixel driver PDU2, a light-emitting element ED, and a seventeenth transistor T17.

The light-emitting element ED may emit light in accordance with a driving current generated by the second pixel driver PDU2. The light-emitting element ED may be disposed between the seventeenth transistor T17 and the third power supply line VSL. The first electrode of the light-emitting element ED may be connected to the first electrode of the seventeenth transistor T17, and the second electrode of the light-emitting element ED may be connected to the third power supply line VSL. The first electrode of the light-emitting element ED may be an anode, and the second electrode of the light-emitting element ED may be a cathode. The light-emitting element ED may be an inorganic light-emitting element including a first electrode, a second electrode, and an inorganic semiconductor between the first and second electrodes. For example, the light-emitting element ED may be a micro-light-emitting diode (LED) including an inorganic semiconductor, but the present disclosure is not limited thereto.

The first pixel driver PDU1 may generate a control current based on a data voltage from a data line DL and may control the voltage of a fifth node N5 of the second pixel driver PDU2. The control current of the first pixel driver PDU1 may control the pulse width of a voltage applied to the first electrode of the light-emitting element ED, and the first pixel driver PDU1 may perform PWM on the voltage applied to the first electrode of the light-emitting element ED. Thus, the first pixel driver PDU1 may be a PWM unit.

The first pixel driver PDU1 may include first through seventh transistors T1 through T7 and a first capacitor C1.

The first transistor T1 may control a control current that flows between the first and second electrodes of the first transistor T1 based on a data voltage applied to the gate electrode of the first transistor T1.

The second transistor T2 may be turned on based on a scan write signal from the scan write line GWL1 to supply the data voltage from the data line DL to a second node N2, which is the first electrode of the first transistor T1. The gate electrode of the second transistor T2 may be connected to the scan write line GWL1, the first electrode of the second transistor T2 may be connected to the data line DL, and the second electrode of the second transistor T2 may be connected to the second node N2.

The third transistor T3 may be turned on based on the scan write signal from the scan write line GWL1 to connect (e.g., electrically connect) a first node N1, which is the gate electrode of the first transistor T1, and a third node N3, which is the second electrode of the first transistor T1. Thus, the first transistor T1 may operate as a diode (e.g., operate as a diode-connected transistor) while the third transistor T3 is on.

The third transistor T3 may include a plurality of transistors, which are connected in series. For example, the third transistor T3 may include (3-1)-th and (3-2)-th transistors T31 and T32. The (3-1)-th and (3-2)-th transistors T31 and T32 may prevent or substantially prevent the voltage of the gate electrode of the first transistor T1 from leaking through the third transistor T3. The gate electrode of the (3-1)-th transistor T31 may be connected to the scan write line GWL1, the first electrode of the (3-1)-th transistor T31 may be connected to the third node N3, and the second electrode of the (3-1)-th transistor T31 may be connected to the first electrode of the (3-2)-th transistor T32. The gate electrode of the (3-2)-th transistor T32 may be connected to the scan write line GWL1, the first electrode of the (3-2)-th transistor T32 may be connected to the second electrode of the (3-1)-th transistor T31, and the second electrode of the (3-2)-th transistor T32 may be connected to the first node N1.

The fourth transistor T4 may be turned on based on a start scan initialization signal from the start scan initialization line GIL1 to connect (e.g., electrically connect) the start scan initialization line GIL1 and the first node N1. The first node N1, which is the gate electrode of the first transistor T1, may be discharged to as low as the initialization voltage VINT (e.g., the initialization voltage VINT from the initialization voltage line VIL) while the fourth transistor T4 is on. A gate-on voltage VGL of the start scan initialization signal may differ from the initialization voltage VINT from the initialization voltage line VIL. As the difference between the gate-on voltage VGL and the initialization voltage VINT is greater than the threshold voltage of the fourth transistor T4, the fourth transistor T4 can be stably turned on even after the application of the initialization voltage VINT to the gate electrode of the first transistor T1. Thus, when the fourth transistor T4 is turned on, the first node N1 can stably receive the initialization voltage VINT regardless of the threshold voltage of the fourth transistor T4.

The fourth transistor T4 may include a plurality of transistors, which are connected in series. For example, the fourth transistor T4 may include (4-1)-th and (4-2)-th transistors T41 and T42. The (4-1)-th and (4-2)-th transistors T41 and T42 may prevent or substantially prevent the voltage of the first node N1 from leaking through the fourth transistor T4. The gate electrode of the (4-1)-th transistor T41 may be connected to the start scan initialization line GIL1, the first electrode of the (4-1)-th transistor T41 may be connected to the first node N1, and the second electrode of the (4-1)-th transistor T41 may be connected to the first electrode of the (4-2)-th transistor T42. The gate electrode of the (4-2)-th transistor T42 may be connected to the start scan initialization line GIL1, the first electrode of the (4-2)-th transistor T42 may be connected to the second electrode of the (4-1)-th transistor T41, and the second electrode of the (4-2)-th transistor T42 may be connected to the initialization voltage line VIL.

The fifth transistor T5 may be turned on based on a PWM emission signal from the PWM emission line PWEL to connect (e.g., electrically connect) the first power supply line VDL1 and the second node N2, which is the first electrode of the first transistor T1. The gate electrode of the fifth transistor T5 may be connected to the PWM emission line PWEL, the first electrode of the fifth transistor T5 may be connected to the first power supply line VDL1, and the second electrode of the fifth transistor T5 may be connected to the second node N2.

The sixth transistor T6 may be turned on based on the PWM emission signal from the PWM emission line PWEL to connect (e.g., electrically connect) the third node N3, which is the second electrode of the first transistor T1, and the fifth node N5 of the second pixel driver PDU2. The gate electrode of the sixth transistor T6 may be connected to the PWM emission line PWEL, the first electrode of the sixth transistor T6 may be connected to the third node N3, and the second electrode of the sixth transistor T6 may be connected to the fifth node N5 of the second pixel driver PDU2. Thus, the sixth transistor T6 can control the pulse width of the voltage applied to the first electrode of the light-emitting element ED by applying a control current to the fifth node N5, which is the gate electrode of the eighth transistor T8.

Referring to the pixel SP of FIG. 2, the first transistor T1 may provide a control current to the eighth node N8, which is the gate electrode of the fifteenth transistor T15, and the fifteenth transistor T15 may control the pulse width of a driving current flowing in the eighth transistor T8. Referring to the pixel SP of FIG. 3, the first transistor T1 provides a control current to the fifth node N5, which is the gate electrode of the eighth transistor T8. Thus, the pixel SP of FIG. 3 can further minimize or reduce luminance deviations (or variations), as compared to the pixel SP of FIG. 2. Accordingly, the pixel SP of FIG. 3 may not include (e.g., may exclude) the fifteenth transistor T15 of FIG. 2 and can minimize or reduce luminance deviations (or variations) by preventing or substantially preventing a duty distribution and an amplitude distribution to improve the threshold voltage distribution margin of transistors.

Referring to FIG. 3, the seventh transistor T7 may be turned on based on a repeat scan initialization signal from the repeat scan initialization line GIL2 to provide the gate-off voltage VGH from the gate-off voltage line VGHL to the second capacitor electrode of the first capacitor C1, which is connected to the sweep line SWPL. Thus, variations in the voltage of the gate electrode of the first transistor T1 can be prevented or substantially prevented from being reflected in a sweep signal from the sweep line SWPL by the first capacitor C1 while the initialization voltage VINT is being applied to the gate electrode of the first transistor T1 and the data voltage from the data line DL and a threshold voltage Vth of the first transistor T1 are being programmed. The gate electrode of the seventh transistor T7 may be connected to the repeat scan initialization line GIL2, the first electrode of the seventh transistor T7 may be connected to the gate-off voltage line VGHL, and the second electrode of the seventh transistor T7 may be connected to the sweep line SWPL.

The first capacitor C1 may be connected between the first node N1 and the sweep line SWPL. The first capacitor electrode of the first capacitor C1 may be connected to the first node N1, and the second capacitor electrode of the first capacitor C1 may be connected to the sweep line SWPL.

The second pixel driver PDU2 may generate a driving current to be provided to the light-emitting element ED, based on the first PAM data voltage from the first PAM data line RDL. The second pixel driver PDU2 may be a PAM unit performing PAM. The second pixel driver PDU2 may be a constant current generation unit that receives the same PAM data voltage and generates the same driving current regardless of the luminance of the pixel SP.

The second pixel driver PDU2 may include eighth through sixteenth transistors T8 through T16 and a second capacitor C2.

The eighth transistor T8 may control the period for which a driving current flows, based on the voltage applied to the fifth node N5, which is the gate electrode of the eighth transistor T8. The eighth transistor T8 may control the period for which the driving current is provided to the light-emitting element ED, based on the voltage of the fifth node N5.

The ninth transistor T9 may be turned on based on a scan control signal from the scan control line GWL2 to provide the first PAM data voltage from the first PAM data line RDL to a sixth node N6, which is the first electrode of the eighth transistor T8. The gate electrode of the ninth transistor T9 may be connected to the scan control line GWL2, the first electrode of the ninth transistor T9 may be connected to the first PAM data line RDL, and the second electrode of the ninth transistor T9 may be connected to the first electrode of the eighth transistor T8.

The tenth transistor T10 may be turned on based on the scan control signal from the scan control line GWL2 to connect (e.g., electrically connect) the fifth node N5, which is the gate electrode of the eighth transistor T8, and a seventh node N7, which is the second electrode of the eighth transistor T8. Thus, the eighth transistor T8 may operate as a diode (e.g., operate as a diode-connected transistor) while the tenth transistor T10 is on.

The tenth transistor T10 may include a plurality of transistors, which are connected in series. For example, the tenth transistor T10 may include (10-1)-th and (10-2)-th transistors T101 and T102. The (10-1)-th and (10-2)-th transistors T101 and T102 may prevent or substantially prevent the voltage of the fifth node N5 from leaking through the tenth transistor T10. The gate electrode of the (10-1)-th transistor T101 may be connected to the scan control line GWL2, the first electrode of the (10-1)-th transistor T101 may be connected to the seventh node N7, and the second electrode of the (10-1)-th transistor T101 may be connected to the first electrode of the (10-2)-th transistor T102. The gate electrode of the (10-2)-th transistor T102 may be connected to the scan control line GWL2, the first electrode of the (10-2)-th transistor T102 may be connected to the second electrode of the (10-1)-th transistor T101, and the second electrode of the (10-2)-th transistor T102 may be connected to the fifth node N5.

The eleventh transistor T11 may be turned on based on the repeat scan initialization signal from the repeat scan initialization line GIL2 to connect (e.g., electrically connect) the initialization voltage line VIL and the fifth node N5. The fifth node N5 may be discharged to as low as the initialization voltage VINT (e.g., the initialization voltage VINT from the initialization voltage line VIL) while the eleventh transistor T11 is on. The gate-on voltage VGL of the repeat scan initialization signal may differ from the initialization voltage VINT. As the difference between the gate-on voltage VGL and the initialization voltage VINT is greater than the threshold voltage of the eleventh transistor T11, the eleventh transistor T11 can be stably turned on even after the application of the initialization voltage VINT to the fifth node N5. Thus, when the eleventh transistor T11 is turned on, the fifth node N5 can stably receive the initialization voltage VINT regardless of the threshold voltage of the eleventh transistor T11.

The eleventh transistor T11 may include a plurality of transistors, which are connected in series. For example, the eleventh transistor T11 may include (11-1)-th and (11-2)-th transistors T111 and T112. The (11-1)-th and (11-2)-th transistors T111 and T112 may prevent or substantially prevent the voltage of the fifth node N5 from leaking through the eleventh transistor T11. The gate electrode of the (11-1)-th transistor T111 may be connected to the repeat scan initialization line GIL2, the first electrode of the (11-1)-th transistor T111 may be connected to the fifth node N5, and the second electrode of the (11-1)-th transistor T111 may be connected to the first electrode of the (11-2)-th transistor T112. The gate electrode of the (11-2)-th transistor T112 may be connected to the repeat scan initialization line GIL2, the first electrode of the (11-2)-th transistor T112 may be connected to the second electrode of the (11-1)-th transistor T111, and the second electrode of the (11-2)-th transistor T112 may be connected to the initialization voltage line VIL.

The twelfth transistor T12 may be turned on based on the PWM emission signal from the PWM emission line PWEL to connect (e.g., electrically connect) the sixth node N6, which is the first electrode of the eighth transistor T8, and the second power supply line VDL2. The gate electrode of the twelfth transistor T12 may be connected to the PWM emission line PWEL, the first electrode of the twelfth transistor T12 may be connected to the first power supply line VDL1, and the second electrode of the twelfth transistor T12 may be connected to the sixth node N6.

The thirteenth transistor T13 may be turned on based on a PAM emission signal from the PAM emission line PAEL to connect (e.g., electrically connect) the seventh node N7 and the eighth node N8, which is the first electrode of the light-emitting element ED. The gate electrode of the thirteenth transistor T13 may be connected to the PAM emission line PAEL, the first electrode of the thirteenth transistor T13 may be connected to the seventh node N7, and the second electrode of the thirteenth transistor T13 may be connected to the eighth node N8.

The fourteenth transistor T14 may be turned on based on the PWM emission signal from the PWM emission line PWEL to connect (e.g., electrically connect) the second power supply line VDL2 and a fourth node N4, which is the second capacitor electrode of the second capacitor C2. The gate electrode of the fourteenth transistor T14 may be connected to the PWM emission line PWEL, the first electrode of the fourteenth transistor T14 may be connected to the second power supply line VDL2, and the second electrode of the fourteenth transistor T14 may be connected to the fourth node N4.

The fifteenth transistor T15 may be turned on based on the repeat scan initialization signal from the repeat scan initialization line GIL2 to connect (e.g., electrically connect) the first power supply line VDL1 and the fourth node N4. The gate electrode of the fifteenth transistor T15 may be connected to the repeat scan initialization line GIL2, the first electrode of the fifteenth transistor T15 may be connected to the first power supply line VDL1, and the second electrode of the fifteenth transistor T15 may be connected to the fourth node N4.

The sixteenth transistor T16 may be turned on based on the repeat scan initialization signal from the repeat scan initialization line GIL2 to connect (e.g., electrically connect) the initialization voltage line VIL and the eighth node N8, which is the first electrode of the light-emitting element ED. The eighth node N8 may be discharged to as low as the initialization voltage VINT (e.g., the initialization voltage VINT from the initialization voltage line VIL) while the sixteenth transistor T16 is on. The gate electrode of the sixteenth transistor T16 may be connected to the repeat scan initialization line GIL2, the first electrode of the sixteenth transistor T16 may be connected to the eighth node N8, and the second electrode of the sixteenth transistor T16 may be connected to the initialization voltage line VIL.

The second capacitor C2 may be connected between the fifth node N5, which is the gate electrode of the eighth transistor T8, and the fourth node N4, which is the second electrode of the fourteenth transistor T14. The first capacitor electrode of the second capacitor C2 may be connected to the fifth node N5, and the second capacitor electrode of the second capacitor C2 may be connected to the fourth node N4.

The seventeenth transistor T17 may be turned on based on a test signal from a test signal line TSTL to connect (e.g., electrically connect) the eighth node N8 and the third power supply line VSL. The gate electrode of the seventeenth transistor T17 may be connected to the test signal line TSTL, the first electrode of the seventeenth transistor T17 may be connected to the eighth node N8, and the second electrode of the seventeenth transistor T17 may be connected to the third power supply line VSL.

One of the first and second electrodes of each of the first through seventeenth transistors T1 through T17 may be a source electrode, and the other electrode of each of the first through seventeenth transistors T1 through T17 may be a drain electrode. The semiconductor layers of the first through seventeenth transistors T1 through T17 may be formed of at least one of polysilicon, amorphous silicon, and an oxide semiconductor. For example, in a case where the semiconductor layers of the first through seventeenth transistors T1 through T17 are formed of polysilicon, the semiconductor layers of the first through seventeenth transistors T1 through T17 may be formed by a low-temperature polysilicon (LTPS) process. In another example, the semiconductor layers of some of the first through seventeenth transistors T1 through T17 may include polycrystalline silicon, monocrystalline silicon, LTPS, and amorphous silicon, and the semiconductor layers of the other transistors may include an oxide semiconductor.

FIG. 3 illustrates that the first through seventeenth transistors T1 through T17 are formed as P-type MOSFETs, but the present disclosure is not limited thereto. In one or more embodiments, the first through seventeenth transistors T1 through T17 may be formed as N-type MOSFETs.

As the pixel SP of FIG. 3 includes fewer transistors and fewer capacitors than the pixel SP of FIG. 2, a duty distribution and the amplitude distribution can both be prevented or substantially prevented from being caused in one transistor, and luminance deviations (or variations) can be minimized or reduced by improving the margin for the threshold voltage distribution of transistors.

Figure 4:
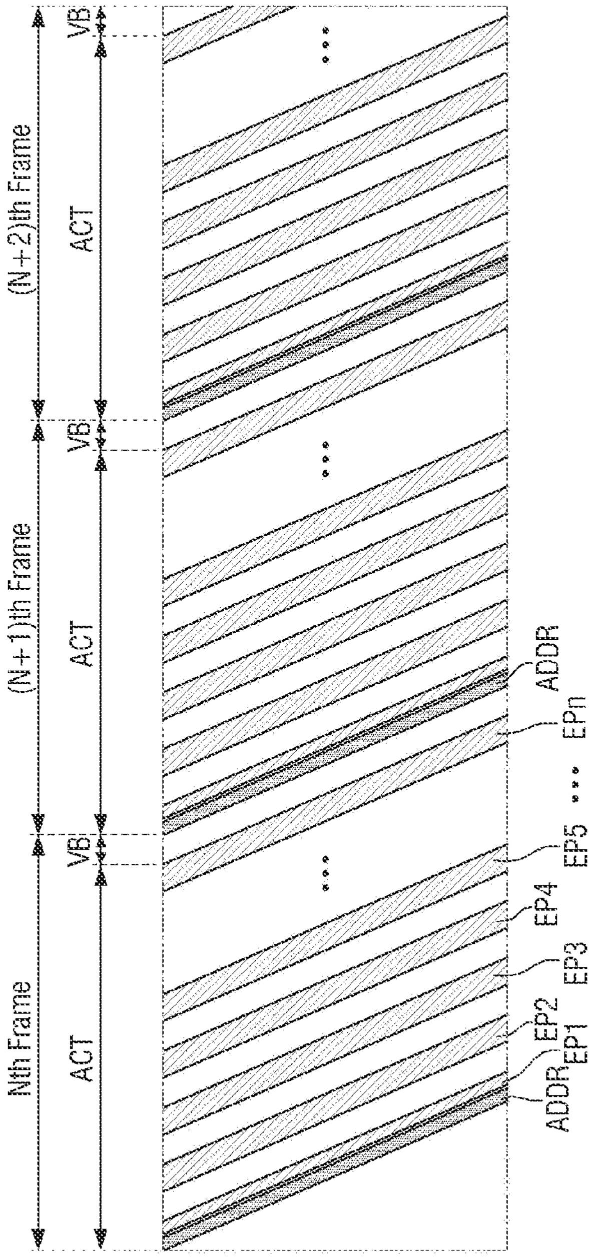
FIG. 4 illustrates an example operation of the display device of FIG. 1 during N-th through (N+2)-th frames.

FIG. 4 illustrates an example operation of the display device of FIG. 1 during N-th through (N+2)-th frames.

Referring to FIG. 4, each of the N-th through (n+2) frames may include an active period ACT and a blank period VB. The active period ACT may include an address period ADDR, during which data voltages and first, second, or third PAM data voltages are provided to each of the pixels SP, and first through n-th emission periods EP1 through EPn, during which the light-emitting elements ED of the pixels SP emit light. The blank period VB may be a period during which the pixels SP pause without operating.

For example, the address period ADDR and the first emission period EP1 may correspond to about five horizontal periods, and each of the second through n-th emission periods EP2 through EPn may correspond to about twelve horizontal periods. However, the present disclosure is not limited to this example. The active period ACT may include 25 emission periods, but the number of emission periods included in the active period ACT is not particularly limited.

The pixels SP may sequentially receive data voltages and first, second, or third PAM data voltages, on a row-by-row basis, during the address period ADDR. For example, first through n-th rows of pixels SP may sequentially receive data voltages and first, second, or third PAM data voltages during the address period ADDR.

The pixels SP may sequentially emit light, on a row-by-row basis, during each of the first through n-th emission periods EP1 through EPn. For example, the first through n-th rows of pixels SP may sequentially emit light during each of the first through n-th emission periods EP1 through EPn.

Figure 5:
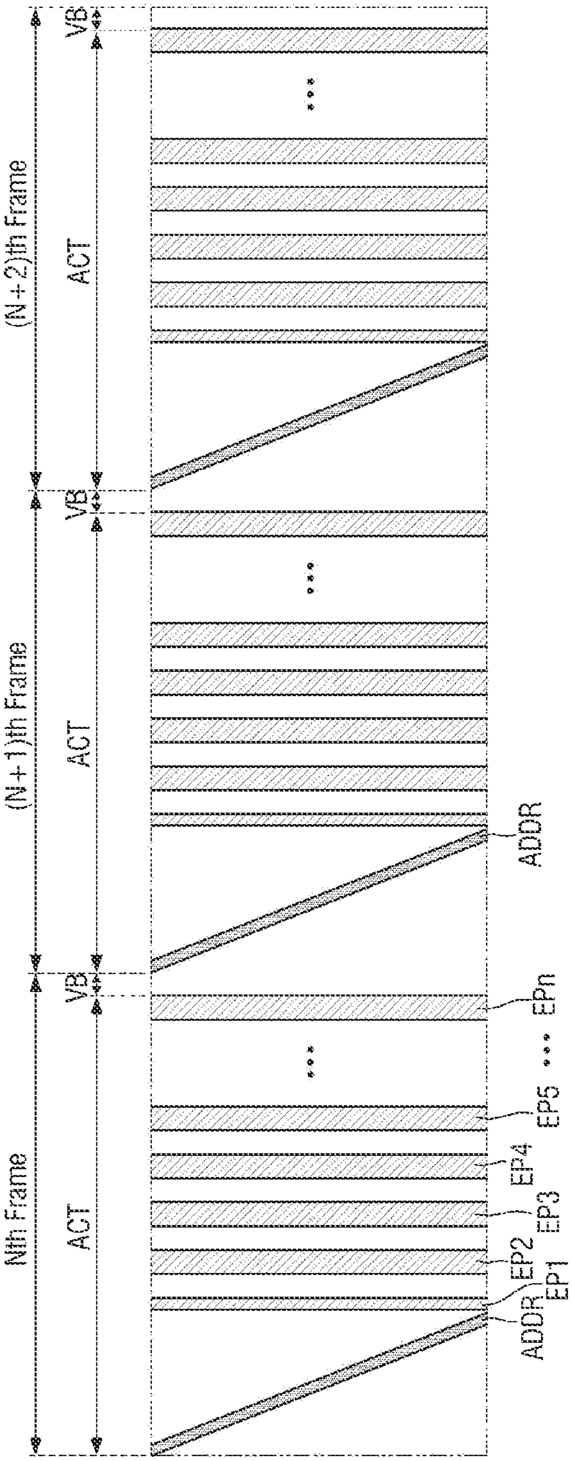
FIG. 5 illustrates another example operation of the display device of FIG. 1 during the N-th through (N+2)-th frames.

FIG. 5 illustrates another example operation of the display device of FIG. 1 during the N-th through (N+2)-th frames.

The embodiment of FIG. 5 differs from the embodiment of FIG. 4 only in that the first pixels SP1, the second pixels SP2, and the third pixels SP3 emit light concurrently (e.g., at the same time) during each of the first through n-th emission periods EP1 through EPn. Thus, a detailed description of the embodiment of FIG. 5 will not be provided.

Figure 6:
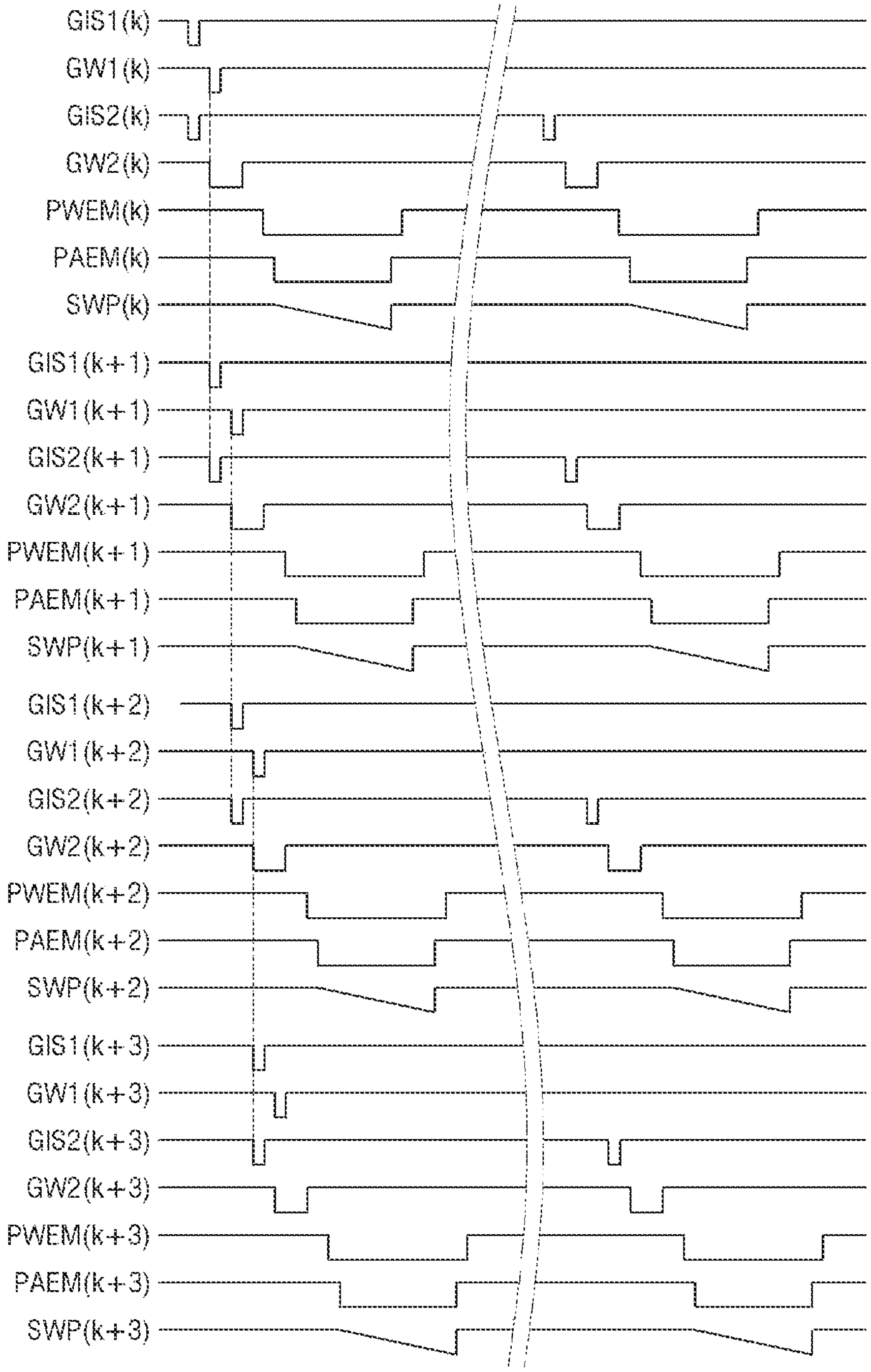
FIG. 6 is a waveform diagram illustrating signals applied to k-th through (k+3)-th rows of pixels of the display device of FIG. 3.

FIG. 6 is a waveform diagram illustrating signals applied to k-th through (k+3)-th rows of pixels of the display device of FIG. 3.

Referring to FIG. 6, the k-th row of pixels SP may be connected to a k-th start scan initialization line GIL1(*k*), a k-th repeat scan initialization line GIL2(*k*), a k-th scan write line GWL1(*k*), a k-th scan control line GWL2(*k*), a k-th sweep line SWPL(k), a k-th PWM emission line PWEL(k), and a k-th PAM emission line PAEL(k).

The k-th start scan initialization line GIL1(*k*) may provide a k-th start scan initialization signal GIS1(*k*), and the k-th repeat scan initialization line GIL2(*k*) may provide a k-th repeat scan initialization signal GIS2(*k*). The k-th scan write line GWL1(*k*) may provide a k-th scan write signal GW1(*k*), and the k-th scan control line GWL2(*k*) may provide a k-th scan control signal GW2(*k*). The k-th sweep line SWPL(k) may provide a k-th sweep signal SWP(k), the k-th PWM emission line PWEL(k) may provide a k-th PWM emission line PWEM(k), and the k-th PAM emission line PAEL(k) may provide a k-th PAM emission signal PAEM(k).

The k-th start scan initialization signal GIS1(*k*), the k-th repeat scan initialization signal GIS2(*k*), the k-th scan write signal GW1(*k*), the k-th scan control signal GW2(*k*), the k-th sweep signal SWP(k), the k-th PWM emission signal PWEM(k), and the k-th PAM emission signal PAEM(k) may be sequentially shifted by as much as one horizontal period 1H, a (k+1)-th start scan initialization signal GIS1(*k*+1), a (k+1)-th repeat scan initialization signal GIS2(*k*+1), a (k+1)-th scan write signal GW1(*k*+1), a (k+1)-th scan control signal GW2(*k*+1), a (k+1)-th sweep signal SWP(k+1), a (k+1)-th PWM emission signal PWEM(k+1), and a (k+1)-th PAM emission signal PAEM(k+1) may be sequentially shifted by as much as one horizontal period 1H, a (k+2)-th start scan initialization signal GIS1(*k*+2), a (k+2)-th repeat scan initialization signal GIS2(*k*+2), a (k+2)-th scan write signal GW1(*k*+2), a (k+2)-th scan control signal GW2(*k*+2), a (k+2)-th sweep signal SWP(k+2), a (k+2)-th PWM emission signal PWEM(k+2), and a (k+2)-th PAM emission signal PAEM(k+2) may be sequentially shifted by as much as one horizontal period 1H, and a (k+3)-th start scan initialization signal GIS1(*k*+3), a (k+3)-th repeat scan initialization signal GIS2(*k*+3), a (k+3)-th scan write signal GW1(*k*+3), a (k+3)-th scan control signal GW2(*k*+3), a (k+3)-th sweep signal SWP(k+3), a (k+3)-th PWM emission signal PWEM(k+3), and a (k+3)-th PAM emission signal PAEM(k+3) may be sequentially shifted by as much as one horizontal period 1H. The k-th scan write signal GW1(*k*) may be obtained by shifting the k-th start scan initialization signal GIS1(*k*) by as much as one horizontal period 1H, and the (k+1)-th scan write signal GW1(*k*+1) may be obtained by shifting the (k+1)-th start scan initialization signal GIS(k+1) by as much as one horizontal period 1H. Thus, the (k+1)-th start scan initialization signal GIS1(*k*+1) and the k-th scan write signal GW1(*k*) may be output concurrently (substantially at the same time).

Figure 7:
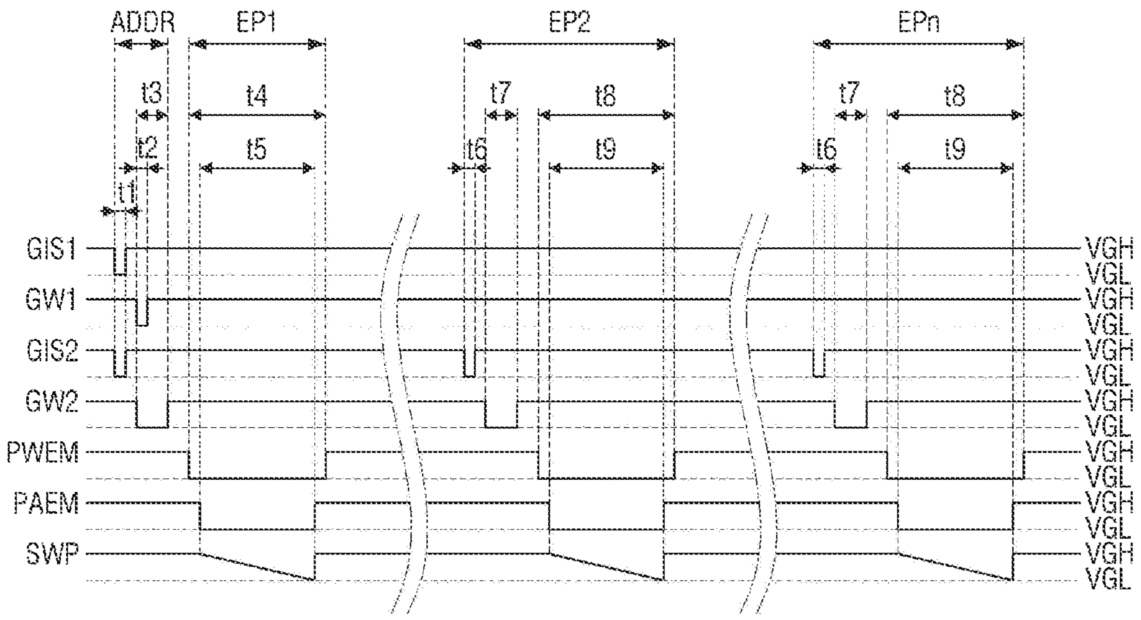
FIG. 7 is a waveform diagram illustrating signals applied to the pixel of FIG. 3 during an address period and emission periods of a frame.

FIG. 7 is a waveform diagram illustrating signals applied to the pixel of FIG. 3 during an address period and emission periods of a frame.

Referring to FIG. 7, a start scan initialization signal GIS1 may control the turning on of the fourth transistor T4. A repeat scan initialization signal GIS2 may control the turning on of the seventh, eleventh, fifteenth, and sixteenth transistors T7, T11, T15, and T16. A scan write signal GW1 may control the turning on of the second and third transistors T2 and T3. A scan control signal GW2 may control the turning on of the ninth and tenth transistors T9 and T10. A PWM emission signal PWEM may control the turning on of the fifth, sixth, twelfth, and fourteenth transistors T5, T6, T12, and T14. A PAM emission signal PAEM may control the turning on of the thirteenth transistor T13. The start scan initialization signal GIS1 and the scan write signal GW1 may be generated at every frame. The repeat scan initialization signal GIS2, the scan control signal GW2, the PWM emission signal PWEM, and the PAM emission signal PAEM may be generated at every emission period. Accordingly, the start scan initialization signal GIS1 and the scan write signal GW1 may be generated once during one frame, and the repeat scan initialization signal GIS2, the scan control signal GW2, the PWM emission signal PWEM, and the PAM emission signal PAEM may be generated as many times as there are emission periods (EP1 through EPn) in one frame, i.e., n times.

An address period ADDR may include first through third periods t1 through t3. The first period t1 may be a period for initializing the first, fourth, fifth, and eighth nodes N1, N4, N5, and N8. The second period t2 may be a period for sampling a data voltage Vdata and a threshold voltage Vth of the first transistor T1 from the first node N1, which is the gate electrode of the first transistor T1. The third period t3 may be a period for sampling a first PAM data voltage VPAM of a first PAM data line RDL and a threshold voltage Vth of the eighth transistor T8 from the eighth node N8. The second and third periods t2 and t3 may follow the first period t1. For example, the second and third periods t2 and t3 may begin after the first period t1 ends. The second and third periods t2 and t3 may begin concurrently (substantially at the same time), and the third period t3 may end after the second period t2. In one or more embodiments, the second period t2 may be shorter in duration than the third period t3.

A first emission period EP1 may include fourth and fifth periods t4 and t5. The fourth period t4 may be a period for applying a control current Ic to the fifth node N5, and the fifth period t5 may be a period for controlling the duration for which the eighth transistor T8 is on, based on the control current Ic, and applying a driving current Idr to the light-emitting element ED.

Each of second through n-th emission periods EP2 through EPn may include sixth through ninth periods t6 through t9. The sixth period t6 may be a period for initializing the fourth, fifth, and eighth nodes N4, N5, and N8. The seventh period t7 may be a period for sampling the first PAM data voltage VPAM of the first PAM data line RDL and the threshold voltage Vth of the eighth transistor T8 from the fifth node N5, which is the gate electrode of the eighth transistor T8. The eighth period t8 may be substantially the same period as the fourth period t4, and the ninth period t9 may be substantially the same period as the fifth period t5. For example, the fourth period t4 and the eighth period t8 may be the same or substantially the same in duration, and the fifth period t5 and the ninth period t9 may be the same or substantially the same in duration.

The first through n-th emission periods EP1 through EPn may be apart from one another by as much as several to dozens of horizontal periods.

The start scan initialization signal GIS1 and the repeat scan initialization signal GIS2 may have the gate-on voltage VGL during the first period t1 and may have the gate-off voltage VGH during the other periods. The scan write signal GW1 may have the gate-on voltage VGL during the second period t2 and may have the gate-off voltage VGH during the other periods (e.g., periods other than the second period t2). The scan control signal GW2 may have the gate-on voltage VGL during the third period t3 and may have the gate-off voltage VGH during the other periods (e.g., periods other than the third period t3). The gate-off voltage VGH may be higher than the gate-on voltage VGL.

The PWM emission signal PWEM may have the gate-on voltage VGL during the fourth and eighth periods t4 and t8 and may have the gate-off voltage VGH during the other periods (e.g., periods other than the fourth and eighth periods t4 and t8). The PAM emission signal PAEM may have the gate-on voltage VGL during the fifth and ninth periods t5 and t9 and may have the gate-off voltage VGH during the other periods (e.g., periods other than the fifth and ninth periods t5 and t9).

A sweep signal SWP may have a triangular wave pulse during the fifth and ninth periods t5 and t9 and may have the gate-off voltage VGH during the other periods (e.g., periods other than the fifth and ninth periods t5 and t9). For example, the sweep signal SWP may linearly decrease from the gate-off voltage VGH to the gate-on voltage VGL during the fifth period t5 and may begin to increase from the gate-on voltage VGL to the gate-off voltage VGH at the end of the fifth period t5.

Figure 8:
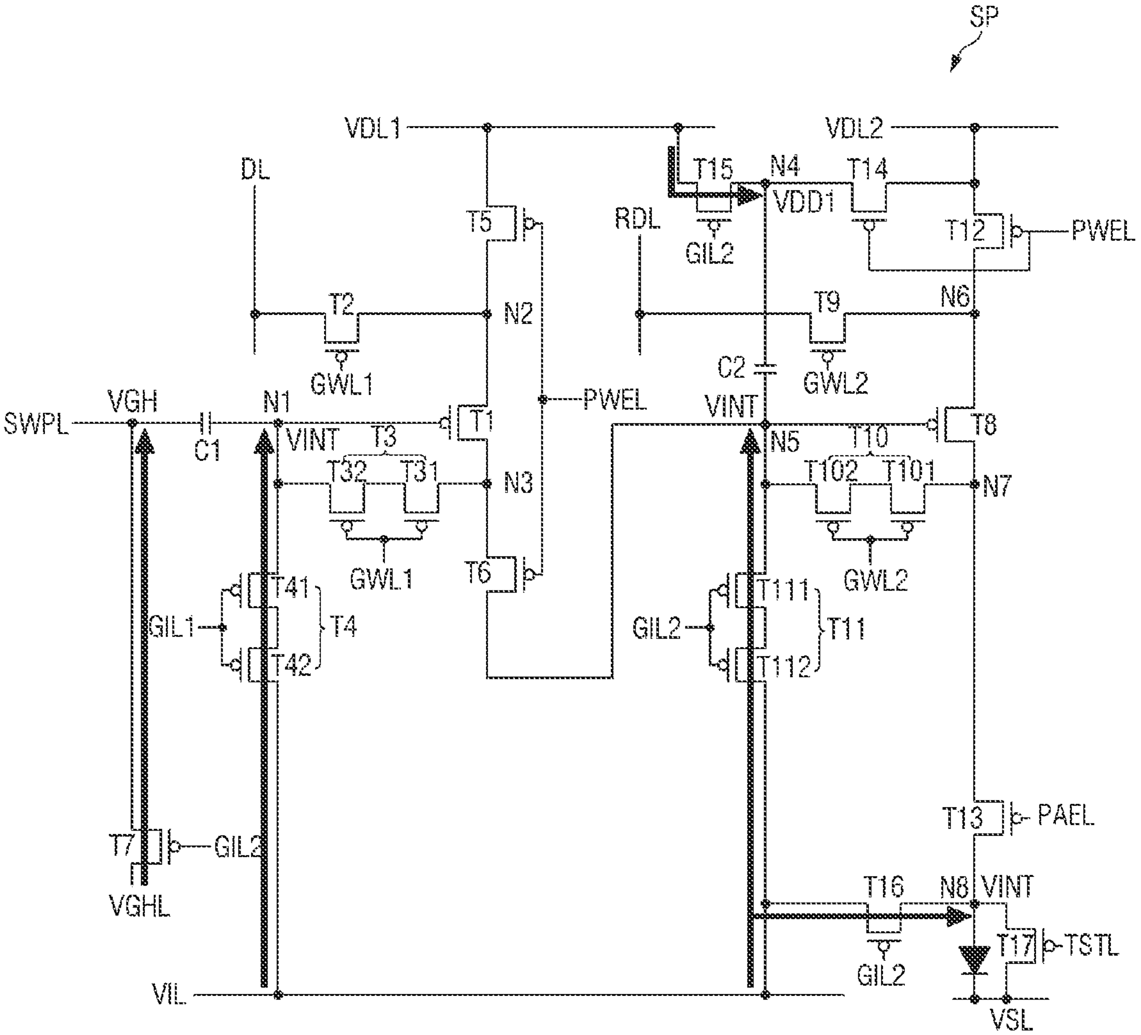
FIG. 8 is a circuit diagram illustrating the operation of the pixel of FIG. 3 during a first period.

FIG. 8 is a circuit diagram illustrating the operation of the pixel of FIG. 3 during the first period t1.

Referring to FIG. 8 and further to FIGS. 3 and 7, the fourth transistor T4 may be turned on based on the start scan initialization signal GIS1 during the first period t1, and the seventh, eleventh, fifteenth, and sixteenth transistors T7, T11, T15, and T16 may be turned on based on the repeat scan initialization signal GIS2.

The initialization voltage VINT may be provided to the first node N1, which is the gate electrode of the first transistor T1, through the fourth transistor T4. The gate-off voltage VGH may be provided to the second capacitor electrode of the first capacitor C1 through the seventh transistor T7. The initialization voltage VINT may be provided to the fifth node N5, which is the gate electrode of the eighth transistor T8, through the eleventh transistor T11. The first power supply voltage VDD1 may be provided to the fourth node N4, which is the second capacitor electrode of the second capacitor C2, through the fifteenth transistor T15. The initialization voltage VINT may be provided to the eighth node N8, which is the first electrode of the light-emitting element ED, through the sixteenth transistor T16.

Figure 9:
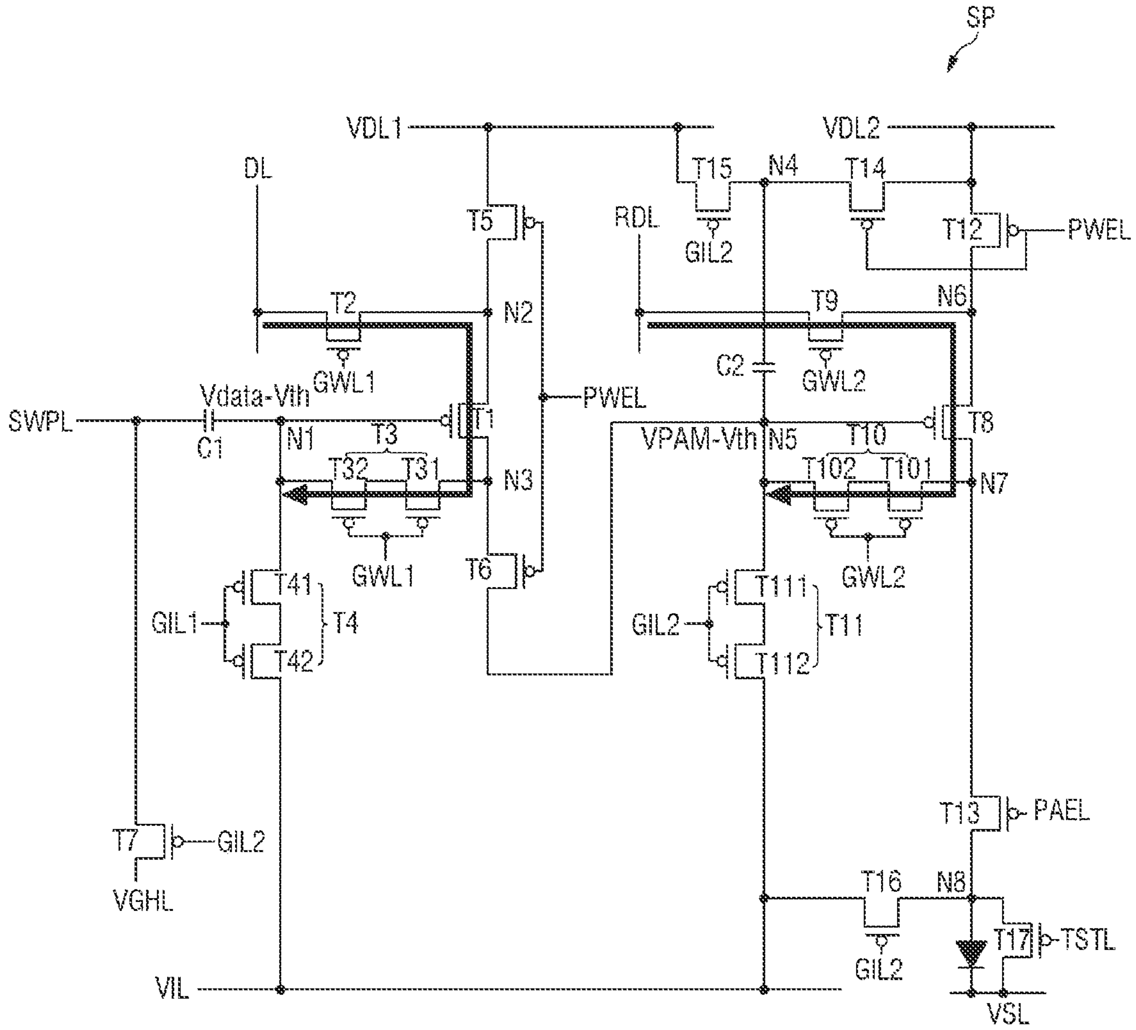
FIG. 9 is a circuit diagram illustrating the operation of the pixel of FIG. 3 during second and third periods.

FIG. 9 is a circuit diagram illustrating the operation of the pixel of FIG. 3 during the second and third periods t2 and t3.

Referring to FIG. 9 and further to FIGS. 3 and 7, the second and third transistors T2 and T3 may be turned on based on the scan write signal GW1 during the second period t2, and the ninth and tenth transistors T9 and T10 may be turned on based on the scan control signal GW2 during the third period t3.

The data voltage Vdata may be provided to the second node N2, which is the first electrode of the first transistor T1, through the second transistor T2. In this case, a voltage Vsg between the first electrode and the gate electrode of the first transistor T1 (where Vsg=Vdata-VINT) may be greater than the threshold voltage Vth of the first transistor T1, and the first transistor T1 may be turned on. As the third transistor T3 is turned on, the second electrode and the gate electrode of the first transistor T1 may be connected (e.g., electrically connected), and the first transistor T1 may operate as a diode (e.g., operate as a diode-connected transistor). The first transistor T1 may be turned on until the voltage Vsg of the first transistor T1 reaches as high as the threshold voltage Vth of the first transistor T1. Thus, the voltage of the first node N1, which is the gate electrode of the first transistor T1, may increase from the initialization voltage VINT to the threshold voltage Vth subtracted from the data voltage Vdata, i.e., Vdata-Vth. For example, in a case where the first transistor T1 is formed as a P-type MOSFET, the threshold voltage Vth of the first transistor T1 may be smaller than 0V, but the present disclosure is not limited thereto.

The first PAM data voltage VPAM may be provided to the sixth node N6, which is the first electrode of the eighth transistor T8, through the ninth transistor T9. In this case, a voltage Vsg between the first electrode and the gate electrode of the eighth transistor T8 (where Vsg=VPAM-VINT) may be greater than the threshold voltage Vth of the eighth transistor T8, and the eighth transistor T8 may be turned on. As the tenth transistor T10 is turned on, the second electrode and the gate electrode of the eighth transistor T8 may be connected (e.g., electrically connected), and the eighth transistor T8 may operate as a diode (e.g., operate as a diode-connected transistor). The eighth transistor T8 may be turned on until the voltage Vsg of the eighth transistor T8 reaches as high as the threshold voltage Vth of the eighth transistor T8. Thus, the voltage of the fifth node N5, which is the gate electrode of the eighth transistor T8, may increase from the initialization voltage VINT to the threshold voltage Vth subtracted from the first PAM data voltage VPAM, i.e., VPAM-Vth. For example, in a case where the eighth transistor T8 is formed as a P-type MOSFET, the threshold voltage Vth of the eighth transistor T8 may be smaller than 0V, but the present disclosure is not limited thereto.

Figure 10:
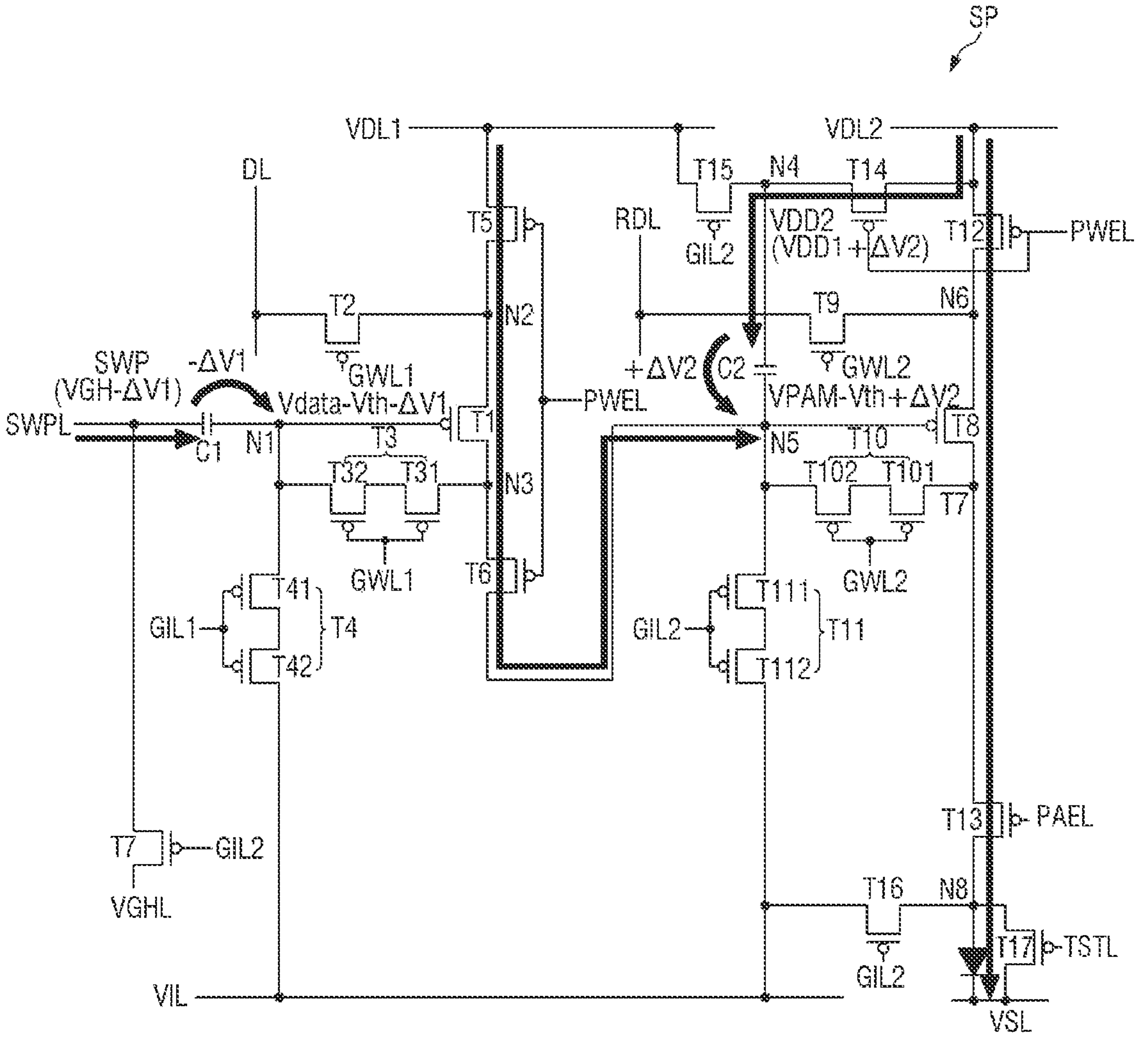
FIG. 10 is a circuit diagram illustrating the operation of the pixel of FIG. 3 during fourth, fifth, eighth, and ninth periods.

FIG. 10 is a circuit diagram illustrating the operation of the pixel of FIG. 3 during the fourth, fifth, eighth, and ninth periods t4, t5, t8, and t9.

Referring to FIG. 10 and further to FIGS. 3 and 7, the fifth, sixth, twelfth, and fourteenth transistors T5, T6, T12, and T14 may be turned on based on the PWM emission signal PWEM during the fourth period t4, and the thirteenth transistor T13 may be turned on based on the PAM emission signal PAEM during the fifth period t5.

The first power supply voltage VDD1 may be provided to the second node N2, which is the first electrode of the first transistor T1, through the fifth transistor T5. As the sixth transistor T6 is turned on, the third node N3, which is the second electrode of the first transistor T1, may be connected (e.g., electrically connected) to the fifth node N5, which is the gate electrode of the eighth transistor T8. However, the voltage of the first node N1, i.e., Vdata-Vth, may be substantially the same as, or higher than, the first power supply voltage VDD1 until the fifth period t5 begins. Thus, the first transistor T1 may be turned off until the fifth period t5 begins.

The second power supply voltage VDD2 may be provided to the fourth node N4, which is the second capacitor electrode of the second capacitor C2, through the fourteenth transistor T14. If the second power supply voltage VDD2 varies due to, for example, a voltage drop, the difference between the first and second power supply voltages VDD1 and VDD2, i.e., ΔV2, may be reflected in the gate electrode of the eighth transistor T8 by the second capacitor C2.

As the fourteenth transistor T14 is turned on, the driving current Idr that flows in accordance with the voltage of the fifth node N5, i.e., VPAM-Vth, may be provided to the thirteenth transistor T13. The driving current Idr may not depend on the threshold voltage Vth of the eighth transistor T8, as indicated by Equation (1):

$$Idr=k'(Vsg-Vth)^2=k'(VDD2-VPAM+Vth-Vth)^2=k'(VDD2-VPAM)^2$$

where K denotes a proportional coefficient determined by the structure and the physical characteristics of the eighth transistor T8, Vth denotes the threshold voltage Vth of the eighth transistor T8, VDD2 denotes the second power supply voltage VDD2, and VPAM denotes the first PAM data voltage VPAM.

The sweep signal SWP may linearly decrease the gate-off voltage VGH to the gate-on voltage VGL during the fifth period t5. A voltage variation in the sweep signal SWP may be reflected into the first node N1 by the first capacitor C1, and the voltage of the first node N1 may be Vdata−Vth1−ΔV1. Thus, during the sixth period t6, as the voltage of the sweep signal SWP decreases, the voltage of the first node N1 may linearly decrease.

A control current Ic flowing in the first transistor T1 during the fifth period t5 may not depend on the threshold voltage Vth of the first transistor T1, as indicated by Equation (2):

$$Ic=k''(Vsg-Vth)^2=k''(VDD1-V\text{data}+Vth-Vth)^2=k''(VDD1-V\text{data})^2$$

where k" denotes a proportional coefficient determined by the structure and the physical characteristics of the first transistor T1, Vth denotes the threshold voltage Vth of the first transistor T1, VDD1 denotes the first power supply voltage VDD1, and Vdata denotes the data voltage Vdata.

The duration for which the control current Ic is applied to the fifth node N5 may vary depending on the magnitude of the data voltage Vdata applied to the first transistor T1. As the voltage of the fifth node N5 varies depending on the magnitude of the data voltage Vdata, the period for which the eighth transistor T8 is on can be controlled. Thus, an actual emission period, i.e., the duration for which the control current Ic is applied to the light-emitting element ED during the fifth period t5, can be controlled by controlling the period for which the eighth transistor T8 is on.

For example, in a case where the data voltage Vdata is data voltage of a peak black grayscale level, the first transistor T1 may be on throughout the entire fifth period t5 in response to a decrease in the voltage of the sweep signal SWP. In this example, the control current Ic of the first transistor T1 may flow to the fifth node N5 throughout the entire fifth period t5, and the voltage of the fifth node N5 may rise to a high level, beginning from the fifth period t5. Thus, the eighth transistor T8 may be turned off during the fifth period t5. As the driving current Idr is not applied to the light-emitting element ED and the voltage of the first electrode of the light-emitting element ED is maintained at the initialization voltage VINT, the light-emitting element ED may not emit light during the fifth period t5.

In another example, in a case where the data voltage Vdata is data voltage of a gray grayscale level, the first transistor T1 may be on during only part of the second half of the fifth period t5 in response to a decrease in the voltage of the sweep signal SWP. In this example, the control current Ic of the first transistor T1 may flow to the fifth node N5 during part of the second half of the fifth period t5, and the voltage of the fifth node N5 may have a high level, beginning from the second part of the fifth period t5. Thus, the eighth transistor T8 may be turned off during part of the second half of the fifth period t5. The driving current Idr may be applied to the light-emitting element ED during part of the first half of the fifth period t5, but not during part of the second half of the fifth period t5. The light-emitting element ED may emit light during part of the first half of the fifth period t5.

In yet another example, in a case where the data voltage Vdata is data voltage of a peak white grayscale level, the first transistor T1 may be turned off throughout the entire fifth period t5 regardless of a decrease in the voltage of the sweep signal SWP. In this example, the control current Ic of the first transistor T1 may not flow to the fifth node N5 throughout the entire fifth period t5, and the voltage of the fifth node N5 may be maintained at the initialization voltage VINT throughout the entire fifth period t5. Thus, the eighth transistor T8 may be turned on throughout the entire fifth period t5. The driving current Idr may be applied to the light-emitting element ED throughout the entire fifth period t5, and the light-emitting element ED may emit light throughout the entire fifth period t5.

In this manner, the emission period of the light-emitting element ED can be controlled by controlling the data voltage Vdata, which is applied to the gate electrode of the first transistor T1. Thus, the magnitude of the driving current Idr, which is applied to the light-emitting element ED, can be uniformly maintained, and the pulse width of a voltage applied to the first electrode of the light-emitting element ED can be controlled, thereby controlling the grayscale level or luminance of a corresponding pixel SP.

For example, in a case where digital video data to be converted into a data voltage is 8 bits long, digital video data to be converted into a peak black-grayscale data voltage may be zero, digital video data to be converted into a peak white-grayscale data voltage may be 255, and digital video data to be converted into a gray-grayscale data voltage may range between 0 and 255.

The eighth and ninth periods t8 and t9 may be substantially the same as the fourth and fifth periods t4 and t5. For example, the fourth period t4 and the eighth period t8 may be the same or substantially the same in duration, and the fifth period t5 and the ninth period t9 may be the same or substantially the same in duration. During each of the second through n-th emission periods EP2 through EPn, the fifth node N5 may be initialized, and the duration for which the driving current Idr, which is generated based on the first PAM data voltage written to the gate electrode of the eighth transistor T8, is applied to the light-emitting element ED can be controlled based on the data voltage Vdata written to the gate electrode of the first transistor T1 during the address period ADDR.

As the test signal from the test signal line TSTL is applied as the gate-off voltage VGH during the active period ACT of the N-th frame, the seventeenth transistor T17 may be turned off during the active period ACT of the N-th frame.

The second pixels SP2 and the third pixels SP3 may operate substantially in the same manner as the first pixels SP1, and thus, a detailed description of how the second pixels SP2 and the third pixels SP3 operate will not be provided.

Figure 11:
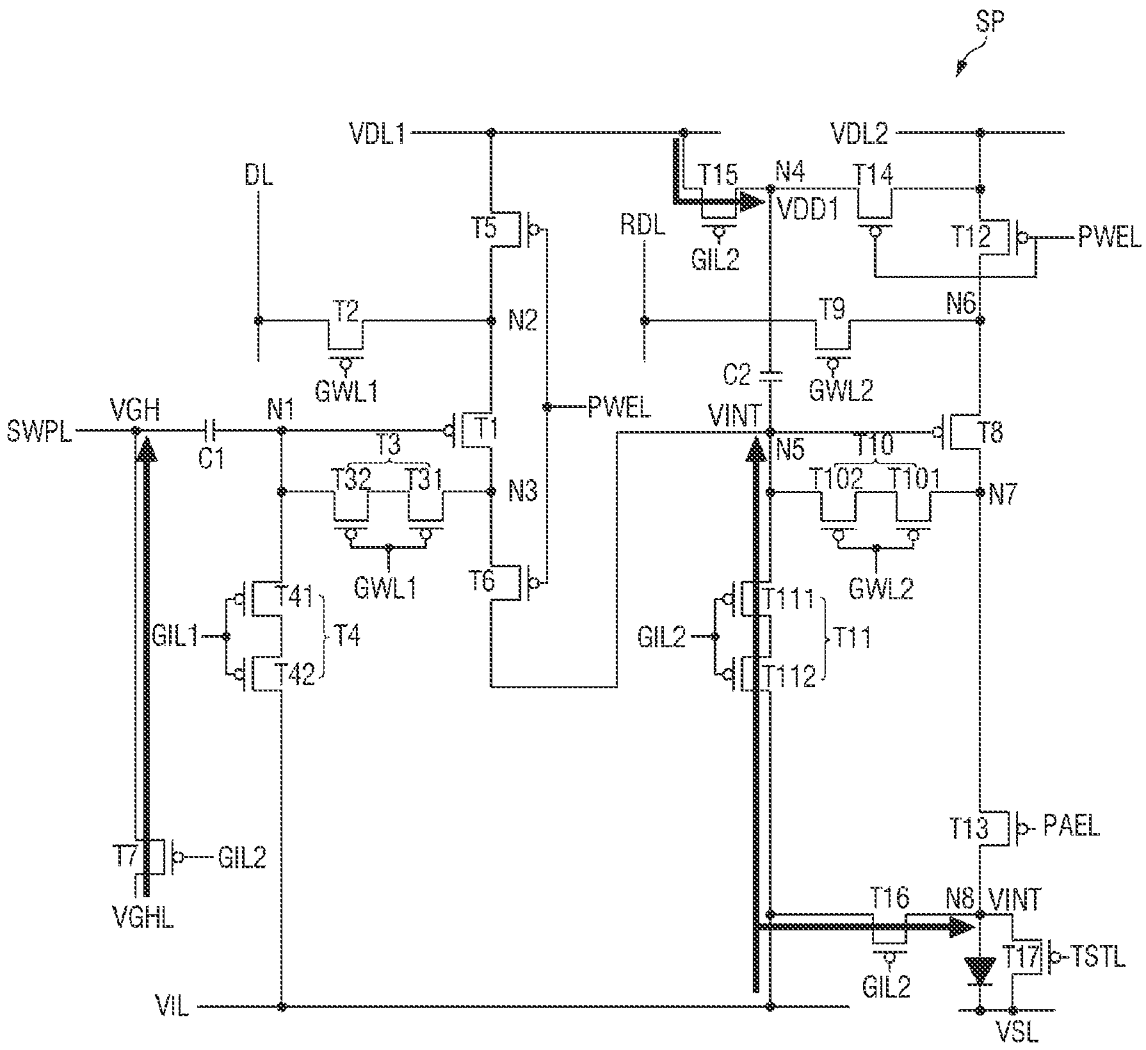
FIG. 11 is a circuit diagram illustrating the operation of the pixel of FIG. 3 during a sixth period.

FIG. 11 is a circuit diagram illustrating the operation of the pixel of FIG. 3 during the sixth period t6.

Referring to FIG. 11 and further to FIGS. 3 and 7, the seventh, eleventh, fifteenth, and sixteenth transistors T7, T11, T15, and T16 may be turned on based on the repeat scan initialization signal GSI2 during the sixth period t6.

The gate-off voltage VGH may be provided to the second capacitor electrode of the first capacitor C1 through the seventh transistor T7. The initialization voltage VINT may be provided to the fifth node N5, which is the gate electrode of the eight transistor T8, through the eleventh transistor T11. The first power supply voltage VDD1 may be provided to the fourth node N4, which is the second capacitor electrode of the second capacitor C2, through the fifteenth transistor T15. The initialization voltage VINT may be provided to the eighth node N8, which is the first electrode of the light-emitting element ED through the sixteenth transistor T16.

Figure 12:
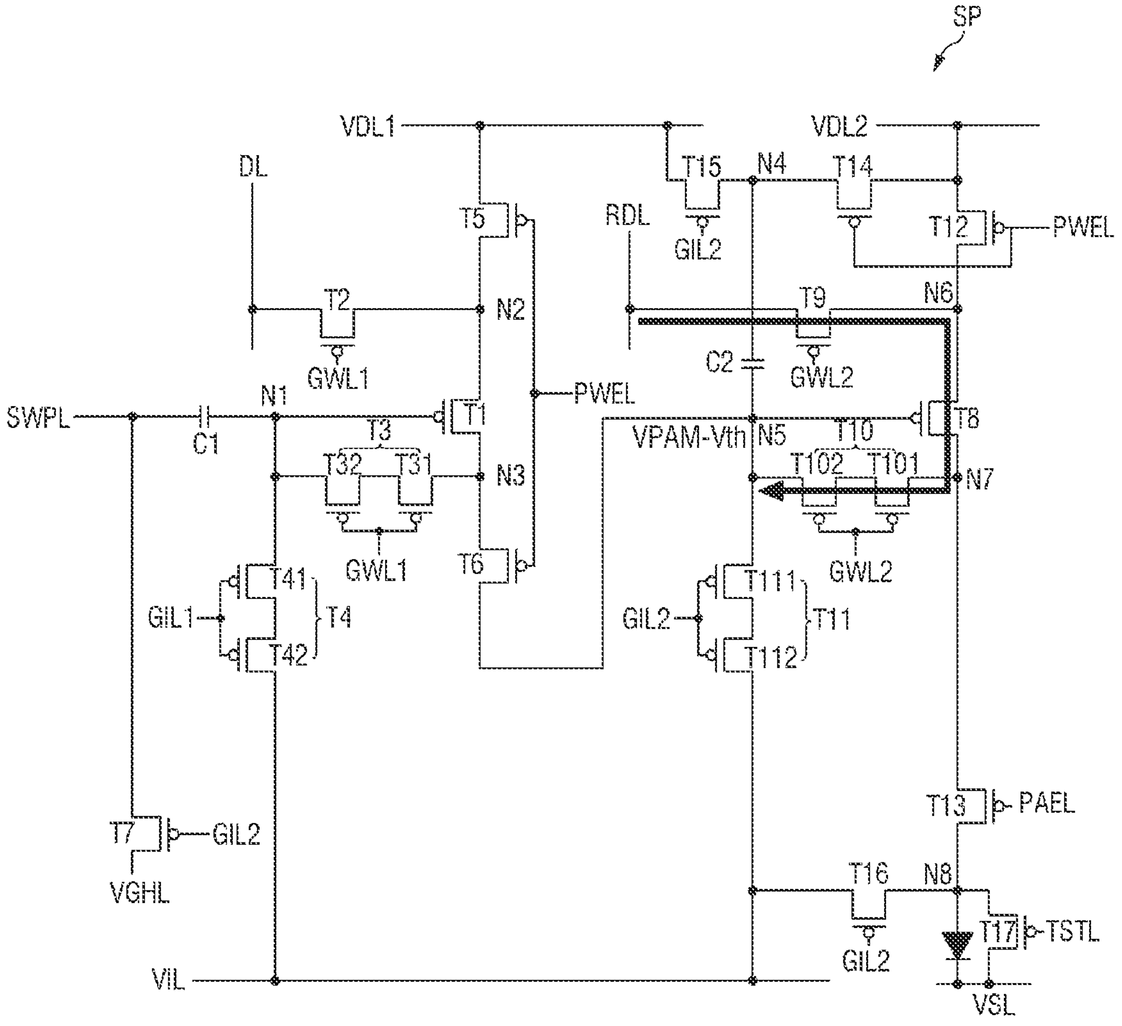
FIG. 12 is a circuit diagram illustrating the operation of the pixel of FIG. 3 during a seventh period.

FIG. 12 is a circuit diagram illustrating the operation of the pixel of FIG. 3 during the seventh period t7.

Referring to FIG. 12 and further to FIGS. 3 and 7, the ninth and tenth transistors T9 and T10 may be turned on based on the scan control signal GW2 during the seventh period t7.

The first PAM data voltage VPAM may be provided to the sixth node N6, which is the first electrode of the eighth transistor T8, through the ninth transistor T9. In this case, a voltage Vsg between the first electrode and the gate electrode of the eighth transistor T8 (where Vsg=VPAM-VINT) may be greater than the threshold voltage Vth of the eighth transistor T8, and the eighth transistor T8 may be turned on. As the tenth transistor T10 is turned on, the second electrode and the gate electrode of the eighth transistor T8 may be connected (e.g., electrically connected), and the eighth transistor T8 may operate as a diode (e.g., operate as a diode-connected transistor). The eighth transistor T8 may be turned on until the voltage Vsg of the eighth transistor T8 reaches as high as the threshold voltage Vth of the eighth transistor T8. Thus, the voltage of the fifth node N5, which is the gate electrode of the eighth transistor T8, may increase from the initialization voltage VINT to the threshold voltage Vth subtracted from the first PAM data voltage VPAM, i.e., VPAM-Vth. For example, in a case where the eighth transistor T8 is formed as a P-type MOSFET, the threshold voltage Vth of the eighth transistor T8 may be smaller than 0V, but the present disclosure is not limited thereto.

Figure 13:
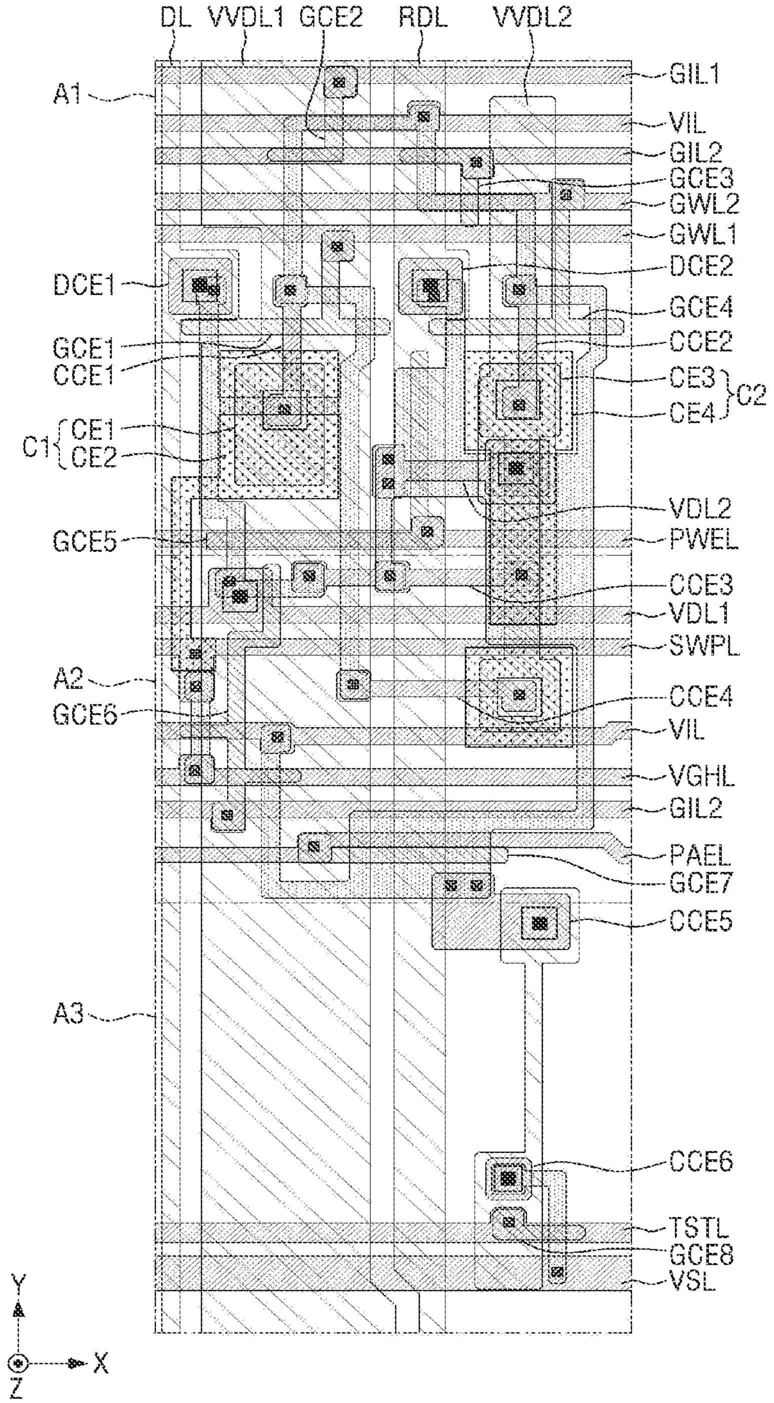
FIG. 13 is a layout view of the pixel of FIG. 3.
Figure 14:
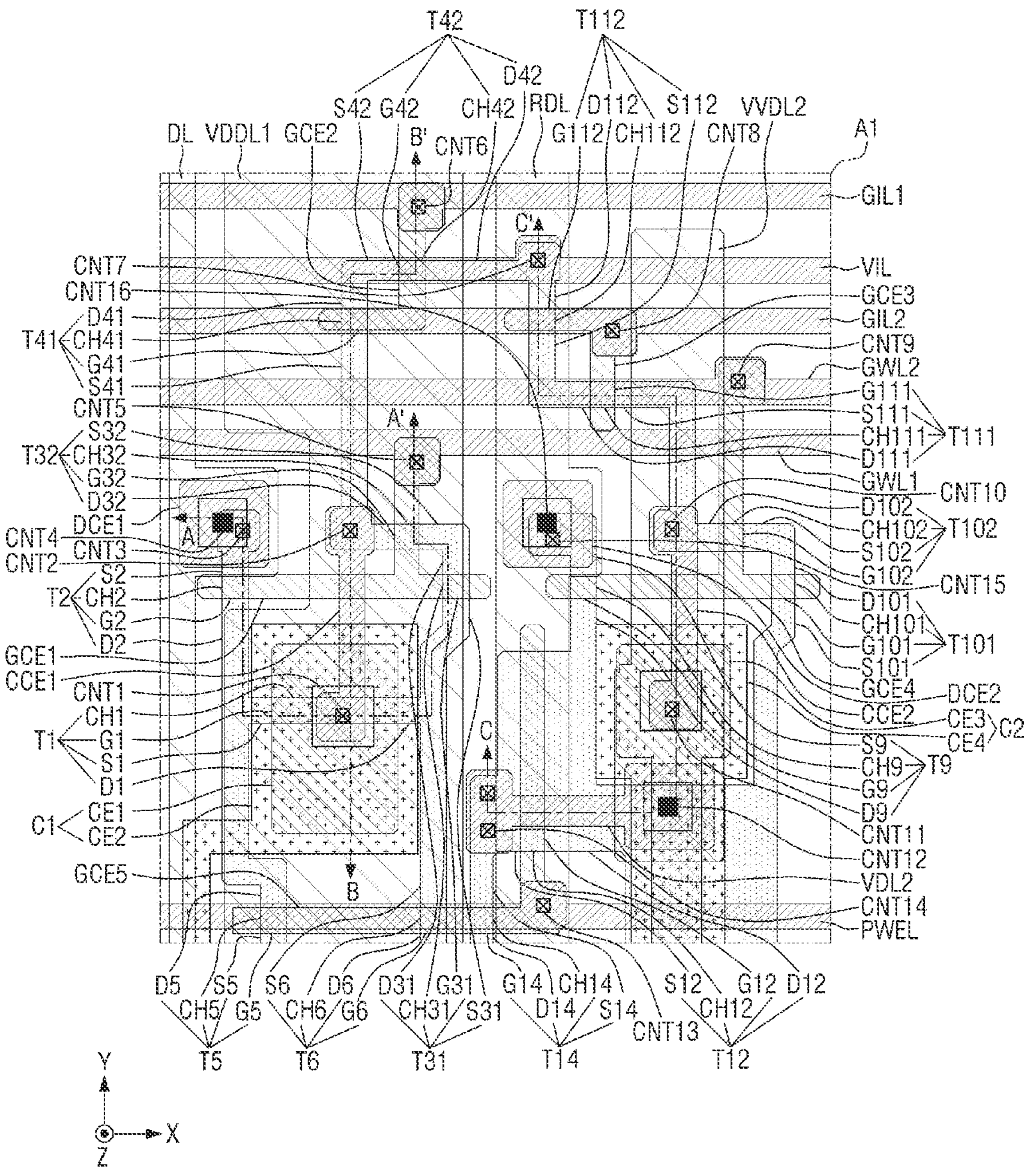
FIG. 14 is an enlarged layout view of an area A1 of FIG. 13.
Figure 15:
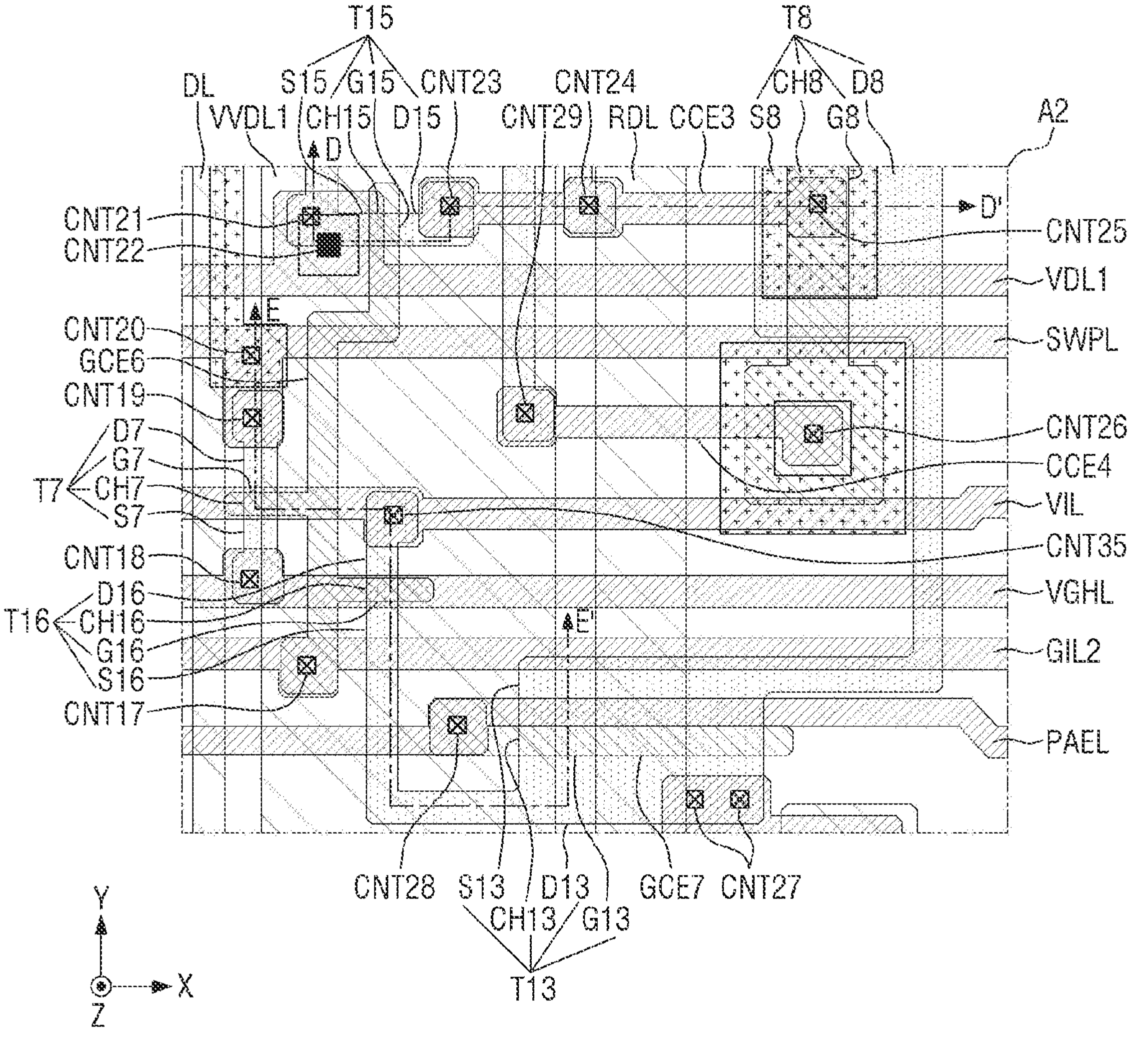
FIG. 15 is an enlarged layout view of an area A2 of FIG. 13.
Figure 16:
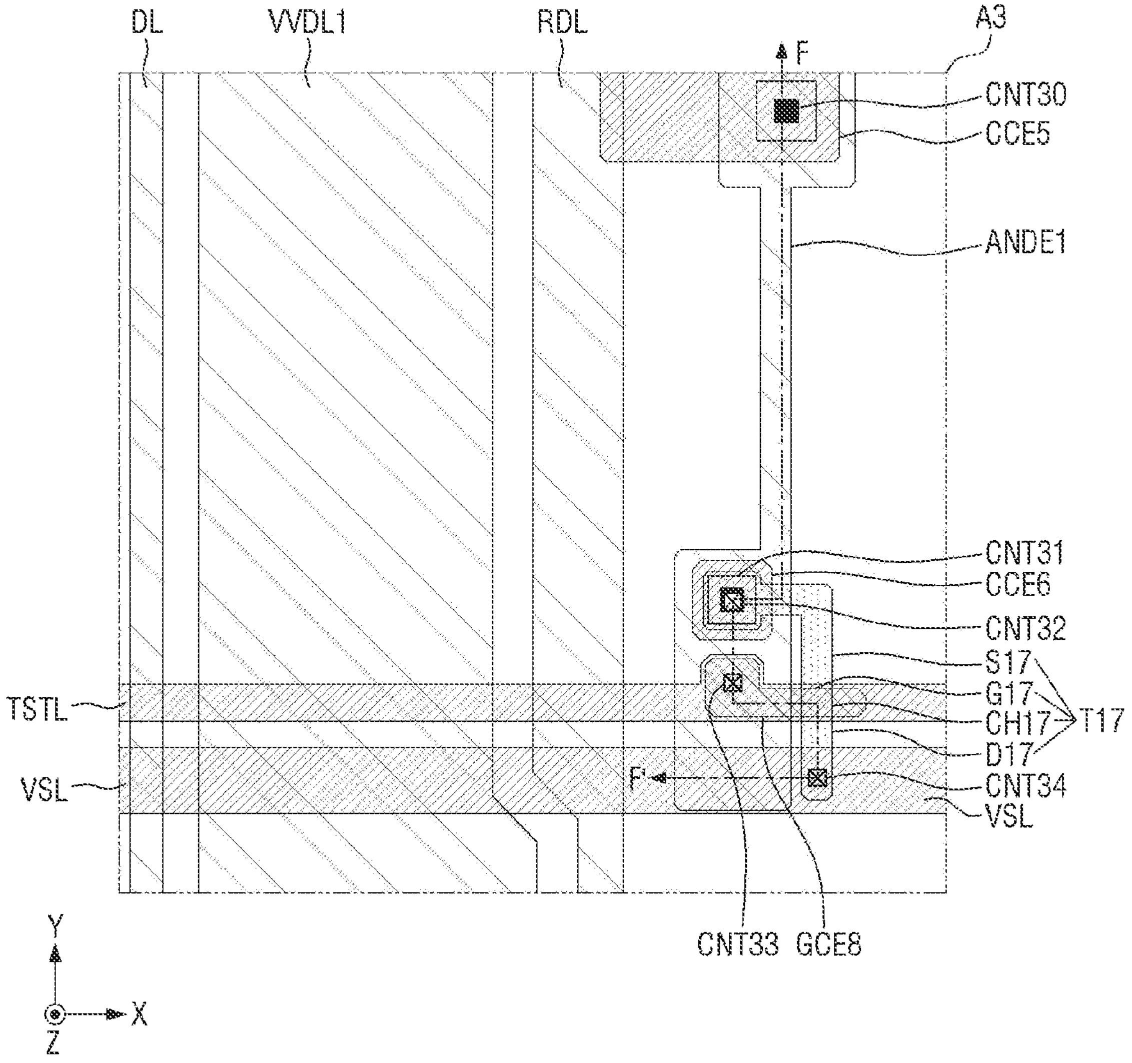
FIG. 16 is an enlarged layout view of an area A3 of FIG. 13.
Figure 17:
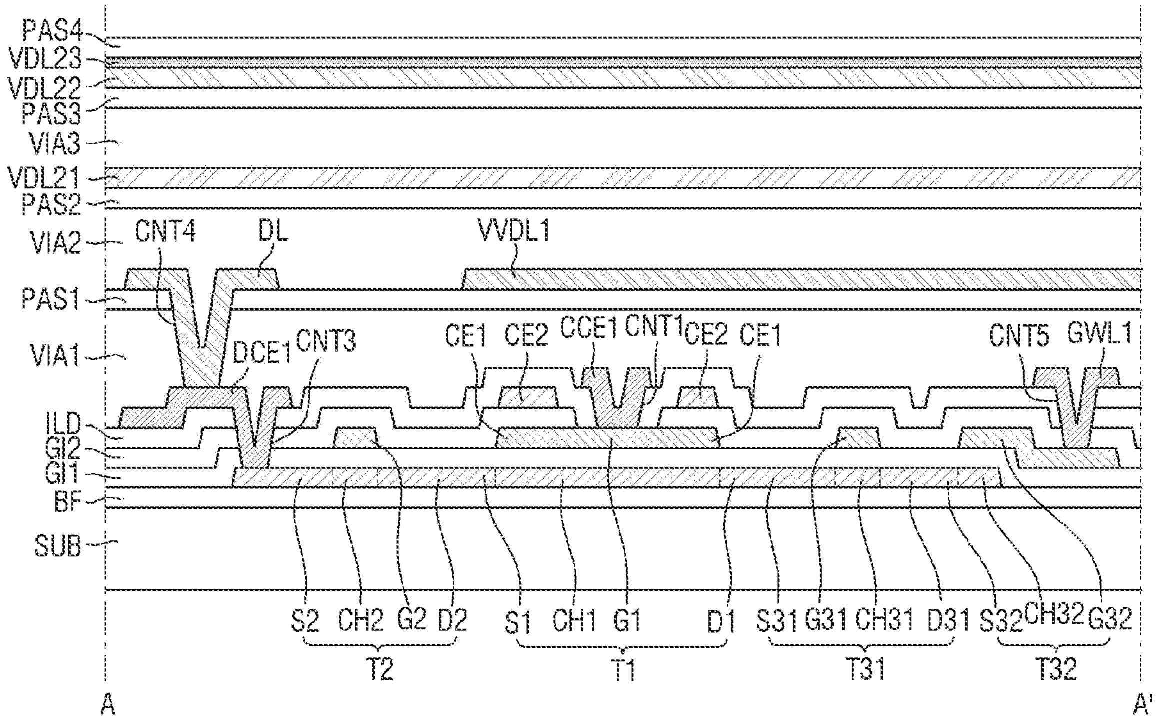
FIG. 17 is a cross-sectional view taken along the line A-A' of FIG. 13.
Figure 18:
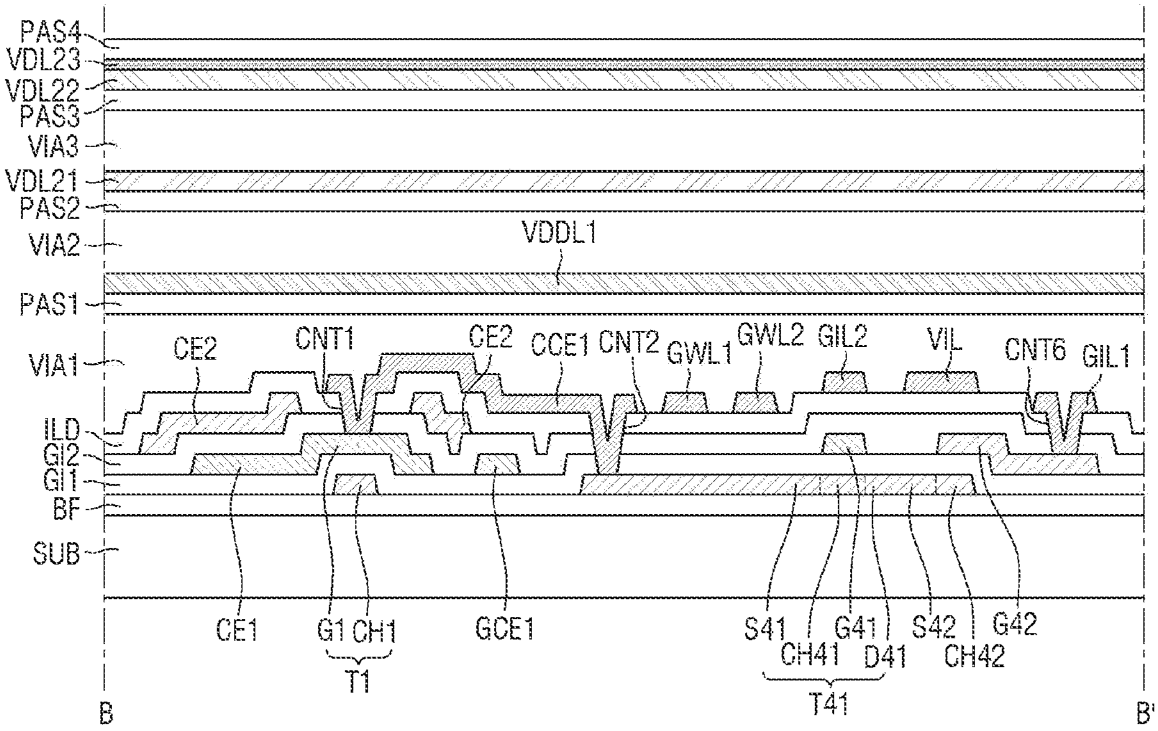
FIG. 18 is a cross-sectional view taken along the line B-B' of FIG. 13.
Figure 19:
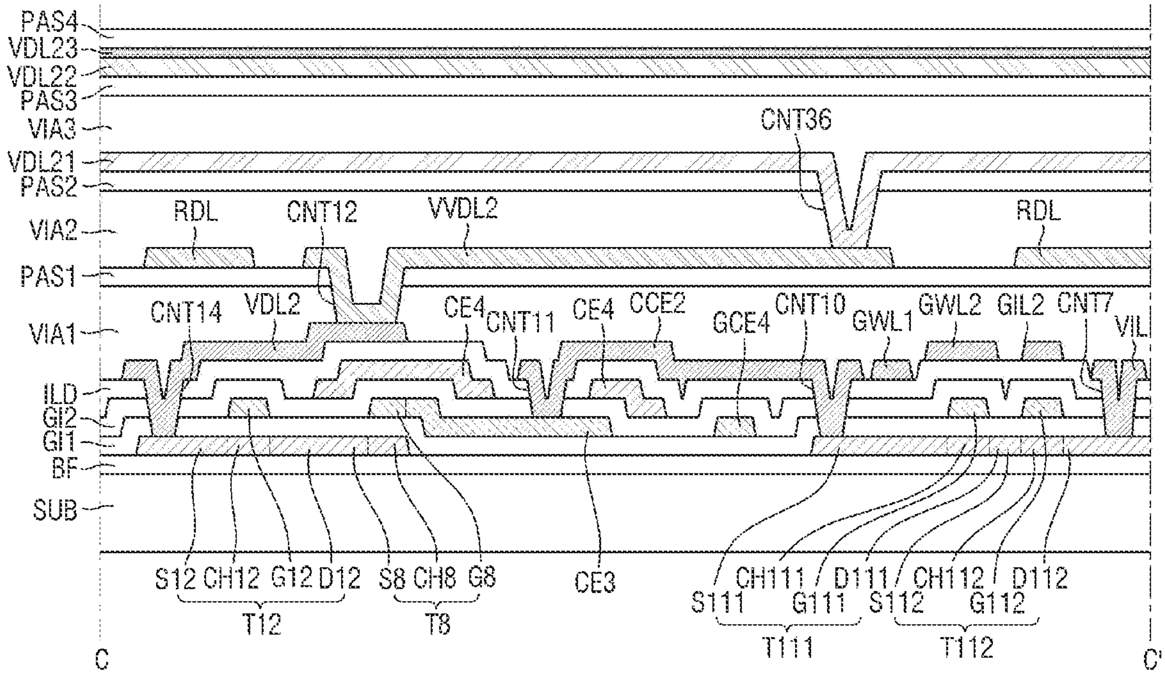
FIG. 19 is a cross-sectional view taken along the line C-C' of FIG. 13.
Figure 20:
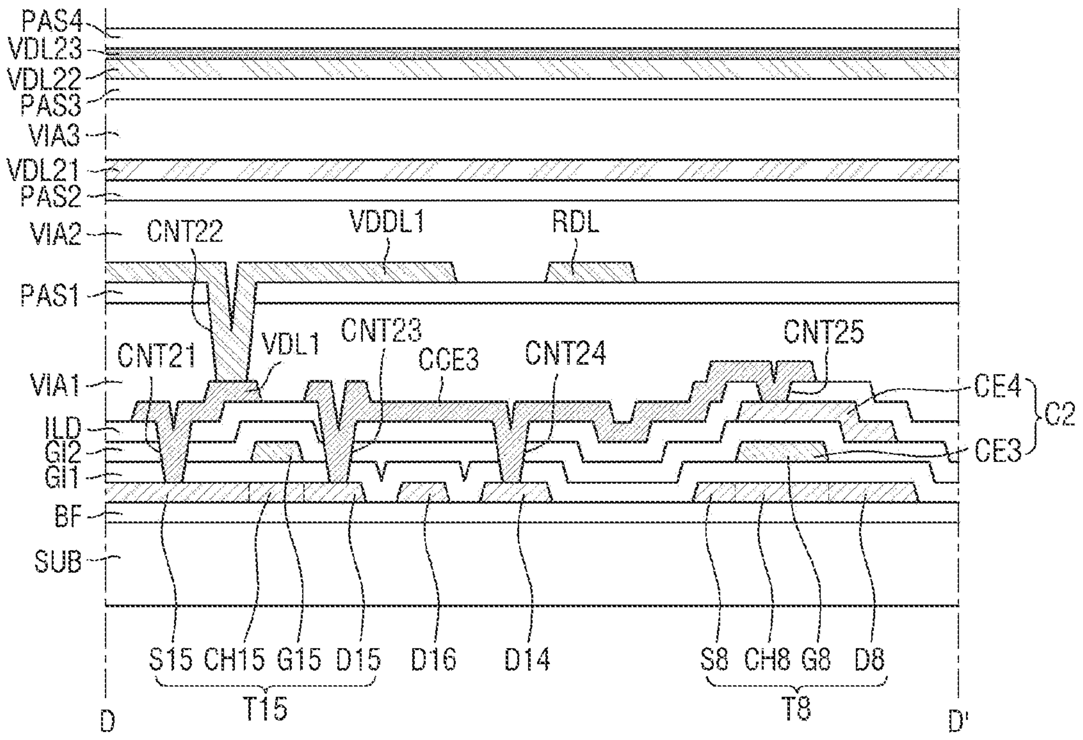
FIG. 20 is a cross-sectional view taken along the line D-D' of FIG. 13.
Figure 21:
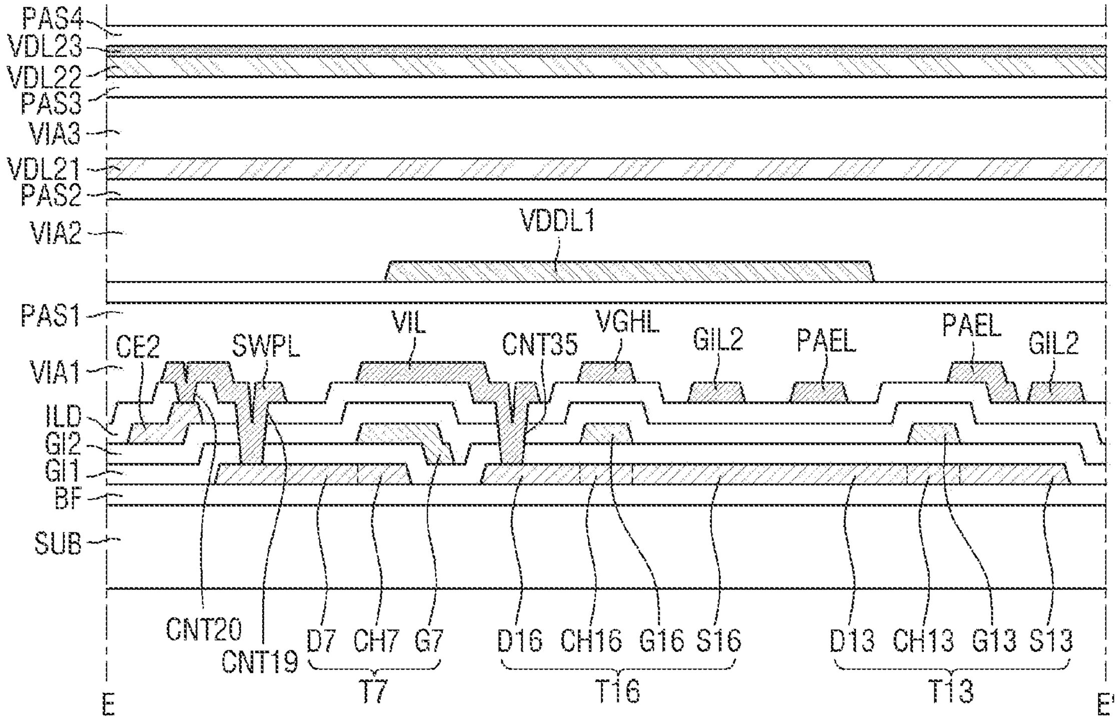
FIG. 21 is a cross-sectional view taken along the line E-E' of FIG. 13.
Figure 22:
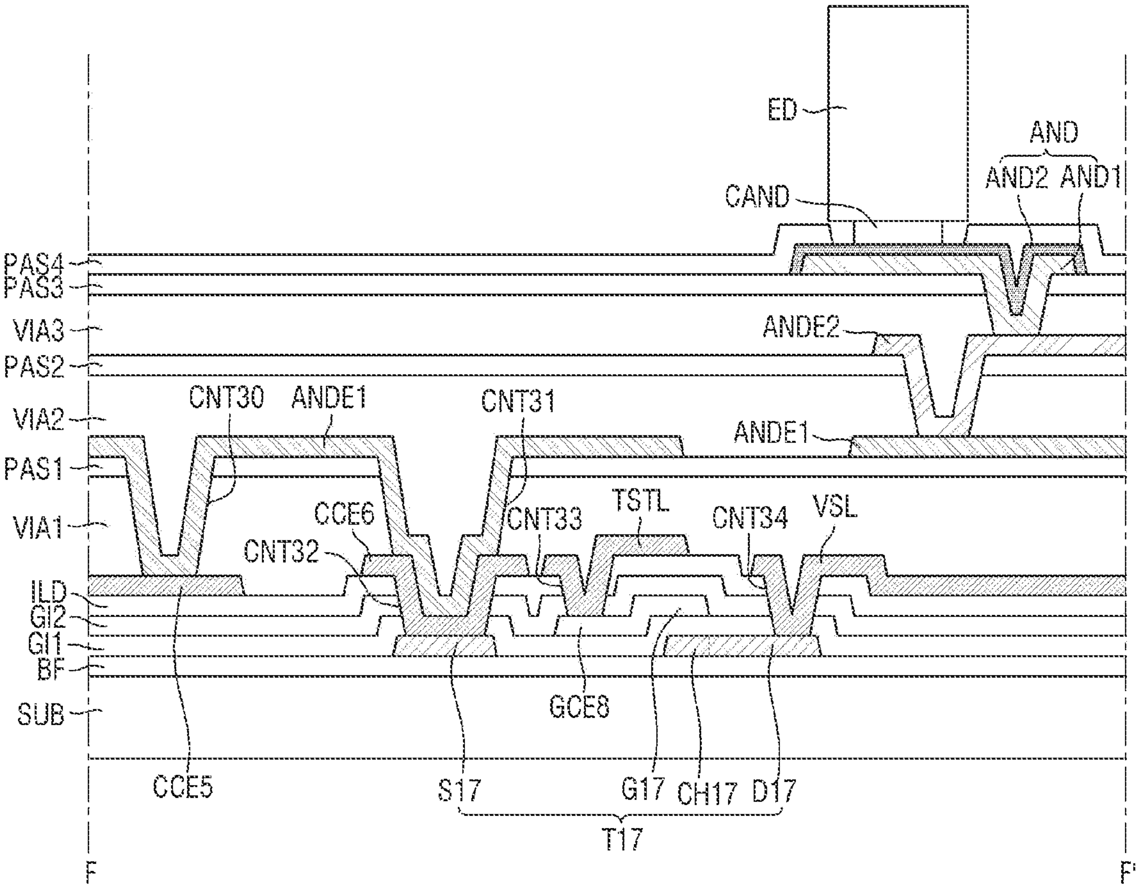
FIG. 22 is a cross-sectional view taken along the line F-F' of FIG. 13.

FIG. 13 is a layout view of the pixel of FIG. 3. FIG. 14 is an enlarged layout view of an area A1 of FIG. 13. FIG. 15 is an enlarged layout view of an area A2 of FIG. 13. FIG. 16 is an enlarged layout view of an area A3 of FIG. 13. FIG. 17 is a cross-sectional view taken along the line A-A' of FIG. 13. FIG. 18 is a cross-sectional view taken along the line B-B' of FIG. 13. FIG. 19 is a cross-sectional view taken along the line C-C' of FIG. 13. FIG. 20 is a cross-sectional view taken along the line D-D' of FIG. 13. FIG. 21 is a cross-sectional view taken along the line E-E' of FIG. 13. FIG. 22 is a cross-sectional view taken along the line F-F' of FIG. 13.

Referring to FIGS. 13 through 22, the start scan initialization signal GIL1, the repeat scan initialization line GIL2, the scan write line GWL1, the scan control line GWL2, the sweep line SWPL, the PWM emission line PWEL, the PAM emission line PAEL, the test signal line TSTL, and the third power supply line VSL may extend in the first direction (or the X-axis direction) and may be spaced from one another in the second direction (or the Y-axis direction).

The data line DL, a first vertical power supply line VVDL1, a second vertical power supply line VVDL2, and the first PAM data line RDL may extend in the second direction (or the Y-axis direction) and may be spaced from one another in the first direction (or the X-axis direction).

The pixel SP may include the first through seventeenth transistors T1 through T17, the first and second capacitors C1 and C2, first through eighth gate connecting electrodes GCE1 through GCE8, first and second data connecting electrodes DCE1 and DCE2, first through sixth connecting electrodes CCE1 through CCE6, first and second anode connecting electrodes ANDE1 and ANDE2, and the light-emitting element ED.

The first transistor T1 may include a first channel CH1, a first gate electrode G1, a first source electrode S1, and a first drain electrode D1. The first channel CH1 may extend in the first direction (or the X-axis direction). The first channel CH1 may overlap with the first gate electrode G1 in the third direction (or the Z-axis direction). In one or more embodiments, the third direction may refer to a thickness direction of the display device (e.g., a thickness direction of a substrate SUB of the display device). The first gate electrode G1 may be connected to the first connecting electrode CCE1 through a first contact hole CNT1. The first gate electrode G1 may be integrally formed with a first capacitor electrode CE1 of the first capacitor C1. The first gate electrode G1 may overlap with a second capacitor electrode CE2 of the first capacitor C1 in the third direction (or the Z-axis direction). The first source electrode S1 may be disposed on one side of the first channel CH1, and the first drain electrode D1 may be disposed on the other side of the first channel CH1. The first source electrode S1 may be connected to the second and fifth drain electrodes D2 and D5. The first drain electrode D1 may be connected to a (3-1)-th source electrode S31 and a sixth source electrode S6. The first source electrode S1 and the first drain electrode D1 may overlap with the second capacitor electrode CE2 of the first capacitor C1 in the third direction (or the Z-axis direction).

The second transistor T2 may include a second channel CH2, a second gate electrode G2, a second source electrode S2, and a second drain electrode D2. The second channel CH2 may overlap with the second gate electrode G2 in the third direction (or the Z-axis direction). The second gate electrode G2 may be part of the first gate connecting electrode GCE1. The second source electrode S2 may be disposed on one side of the second channel CH2, and the second drain electrode D2 may be disposed on the other side of the second channel CH2. The second source electrode S2 may be connected to the first data connecting electrode DCE1 through a third contact hole CNT3. The second drain electrode D2 may be connected to the first source electrode S1. The second drain electrode D2 may extend in the second direction (or the Y-axis direction). The second drain electrode D2 may be connected to the first source electrode S1.

The (3-1)-th transistor T31 of the third transistor T3 may include a (3-1)-th channel CH31, a (3-1)-th gate electrode G31, the (3-1)-th source electrode S31, and a (3-1)-th drain electrode D31. The (3-1)-th channel CH31 may overlap with the (3-1)-th gate electrode G31 in the third direction (or the Z-axis direction). The (3-1)-th gate electrode G31 may be part of the first gate connecting electrode GCE1. The (3-1)-th source electrode S31 may be disposed on one side of the (3-1)-th channel CH31, and the (3-1)-th drain electrode D31 may be disposed on the other side of the (3-1)-th channel CH31. The (3-1)-th source electrode S31 may be connected to the first drain electrode D1 and the sixth source electrode S6. The (3-1)-th drain electrode D31 may be connected to the (3-2)-th source electrode S32.

The (3-2)-th transistor T32 of the third transistor T3 may include a (3-2)-th channel CH32, a (3-2)-th gate electrode G32, a (3-2)-th source electrode S32, and a (3-2)-th drain electrode D32. The (3-2)-th channel CH32 may overlap with the (3-2)-th gate electrode G32 in the third direction (or the Z-axis direction). The (3-2)-th gate electrode G32 may be part of the first gate connecting electrode GCE1. The (3-2)-th source electrode S32 may be disposed on one side of the (3-2)-th channel CH32, and the (3-2)-th drain electrode D32 may be disposed on the other side of the (3-2)-th channel CH32. The (3-2)-th source electrode S32 may be connected to the (3-1)-th drain electrode D31. The (3-2)-th drain electrode D32 may be connected to the first connecting electrode CCE1 through a second contact hole CNT2 and may also be connected to a (4-1)-th source electrode S41.

The (4-1)-th transistor T41 of the fourth transistor T4 may include a (4-1)-th channel CH41, a (4-1)-th gate electrode G41, the (4-1)-th source electrode S41, and a (4-1)-th drain electrode D41. The (4-1)-th channel CH41 may overlap with the (4-1)-th gate electrode G41 in the third direction (or the Z-axis direction). The (4-1)-th gate electrode G41 may be part of the second gate connecting electrode GCE2. The (4-1)-th source electrode S41 may be disposed on one side of the (4-1)-th channel CH41, and the (4-1)-th drain electrode D41 may be disposed on the other side of the (4-1)-th channel CH41. The (4-1)-th source electrode S41 may be connected to the first connecting electrode CCE1 through the second contact hole CNT2 and may also be connected to the (3-2)-th drain electrode D32. The (4-1)-th drain electrode D41 may be connected to a (4-2)-th source electrode S42. The (4-1)-th source electrode S41 may overlap with the scan control line GWL2 in the third direction (or the Z-axis direction). The (4-1)-th drain electrode D41 may overlap with the initialization voltage line VIL in the third direction (or the Z-axis direction).

The (4-2)-th transistor T42 of the fourth transistor T4 may include a (4-2)-th channel CH42, a (4-2)-th gate electrode G42, the (4-2)-th source electrode S42, and a (4-2)-th drain electrode D42. The (4-2)-th channel CH42 may overlap with the (4-2)-th gate electrode G42 in the third direction (or the Z-axis direction). The (4-2)-th gate electrode G42 may be part of the second gate connecting electrode GCE2. The (4-2)-th source electrode S42 may be disposed on one side of the (4-2)-th channel CH42, and the (4-2)-th drain electrode D42 may be disposed on the other side of the (4-2)-th channel CH42. The (4-2)-th source electrode S42 may be connected to the (4-1)-th drain electrode D41 and may also be connected to the initialization voltage line VIL through a seventh contact hole CNT7. The (4-2)-th source electrode S42 and the (4-2)-th drain electrode D42 may overlap with the initialization voltage line VIL in the third direction (or the Z-axis direction).

The fifth transistor T5 may include a fifth channel CH5, a fifth gate electrode G5, a fifth source electrode S5, and a fifth drain electrode D5. The fifth channel CH5 may overlap with the fifth gate electrode G5 in the third direction (or the Z-axis direction). The first gate electrode G5 may be part of the fifth gate connecting electrode GCE5. The fifth source electrode S5 may be disposed on one side of the fifth channel CH5, and the fifth drain electrode D5 may be disposed on the other side of the fifth channel CH5. The fifth source electrode S5 may be connected to the first power supply line VDL1 through a twenty-first contact hole CNT21. The fifth drain electrode D5 may be connected to the first source electrode S1 and the second drain electrode D2. The fifth drain electrode D5 may overlap with an extension of the second capacitor electrode CE2 in the third direction (or the Z-axis direction).

The sixth transistor T6 may include a sixth channel CH6, a sixth gate electrode G6, a sixth source electrode S6, and a sixth drain electrode D6. The sixth channel CH6 may overlap with the sixth gate electrode G6 in the third direction (or the Z-axis direction). The sixth gate electrode G6 may be part of the fifth gate connecting electrode GCE5. The sixth source electrode S6 may be disposed on one side of the sixth channel CH6, and the sixth drain electrode D6 may be disposed on the other side of the sixth channel CH6. The sixth source electrode S6 may be connected to the first drain electrode D1 and the (3-1)-th source electrode S31. The sixth drain electrode D6 may be connected to the fourth connecting electrode CCE4 through a twenty-ninth contact hole CNT29. The sixth drain electrode D6 may overlap with the third connecting electrode CCE3 and the first power supply line VDL1 in the third direction (or the Z-axis direction).

The seventh transistor T7 may include a seventh channel CH7, a seventh gate electrode G7, a seventh source electrode S7, and a seventh drain electrode D7. The seventh channel CH7 may overlap with the seventh gate electrode G7 in the third direction (or the Z-axis direction). The seventh gate electrode G7 may be part of the sixth gate connecting electrode GCE6. The seventh gate electrode G7 may overlap with the initialization voltage line VIL in the third direction (or the Z-axis direction). The seventh source electrode S7 may be disposed on one side of the seventh channel CH7, and the seventh drain electrode D7 may be disposed on the other side of the seventh channel CH7. The seventh source electrode S7 may be connected to the gate-off voltage line VGHL through an eighteenth contact hole CNT18. The seventh drain electrode D7 may be connected to the sweep line SWPL through a nineteenth contact hole CNT19.

The eighth transistor T8 may include an eighth channel CH8, an eighth gate electrode G8, an eighth source electrode S8, and an eighth drain electrode D8. The eighth channel CH8 may overlap with the eighth gate electrode G8 in the third direction (or the Z-axis direction). The eighth gate electrode G8 may extend in the second direction (or the Y-axis direction). The eighth gate electrode G8 may be integrally formed with a first capacitor electrode CE3 of the second capacitor C2. The eighth source electrode S8 may be disposed on one side of the eighth channel CH8, and the eighth drain electrode D8 may be disposed on the other side of the eighth channel CH8. The eighth source electrode S8 may be connected to the ninth and twelfth drain electrodes D9 and D12. The eighth drain electrode D8 may be connected to the (10-1)-th and thirteenth source electrodes S101 and S13.

The ninth transistor T9 may include a ninth channel CH9, a ninth gate electrode G9, a ninth source electrode S9, and a ninth drain electrode D9. The ninth channel CH9 may overlap with the ninth gate electrode G9 in the third direction (or the Z-axis direction). The ninth gate electrode G9 may be part of the fourth gate connecting electrode GCE4. The ninth source electrode S9 may be disposed on one side of the ninth channel CH9, and the ninth drain electrode D9 may be disposed on the other side of the ninth channel CH9. The ninth source electrode S9 may be connected to the second data connecting electrode DCE2 through a fifteenth contact hole CNT15. The ninth drain electrode D9 may be connected to the eighth source electrode D8 and the twelfth drain electrode D12.

The (10-1)-th transistor T101 of the tenth transistor T10 may include a (10-1)-th channel CH101, a (10-1)-th gate electrode G101, a (10-1)-th source electrode S101, and a (10-1)-th drain electrode D101. The (10-1)-th channel CH101 may overlap with the (10-1)-th gate electrode G101 in the third direction (or the Z-axis direction). The (10-1)-th gate electrode G101 may be part of the fourth gate connecting electrode GCE4. The (10-1)-th source electrode S101 may be disposed on one side of the (10-1)-th channel CH101, and the (10-1)-th drain electrode D101 may be disposed on the other side of the (10-1)-th channel CH101. The (10-1)-th source electrode S101 may be connected to a (11-2)-th drain electrode D112 and the thirteenth source electrode S13, and the (10-1)-th drain electrode D101 may be connected to a (10-2)-th source electrode S102.

The (10-2)-th transistor T102 of the tenth transistor T10 may include a (10-2)-th channel CH102, a (10-2)-th gate electrode G102, a (10-2)-th source electrode S102, and a (10-2)-th drain electrode D102. The (10-2)-th channel CH102 may overlap with the (10-2)-th gate electrode G102 in the third direction (or the Z-axis direction). The (10-2)-th gate electrode G102 may be part of the fourth gate connecting electrode GCE4. The (10-2)-th source electrode S102 may be disposed on one side of the (10-2)-th channel CH102, and the (10-2)-th drain electrode D102 may be disposed on the other side of the (10-2)-th channel CH102. The (10-2)-th source electrode S102 may be connected to the (10-2)-th drain electrode D101. The (10-2)-th drain electrode D102 may be connected to a (11-1)-th source electrode S111 and may also be connected to the second connecting electrode CCE2 through a tenth contact hole CNT10.

The (11-1)-th transistor T111 of the eleventh transistor T11 may include a (11-1)-th channel CH111, a (11-1)-th gate electrode G111, a (11-1)-th source electrode S111, and a (11-1)-th drain electrode D111. The (11-1)-th channel CH111 may overlap with the (11-1)-th gate electrode G111 in the third direction (or the Z-axis direction). The (11-1)-th gate electrode G111 may be part of the third gate connecting electrode GCE3. The (11-1)-th source electrode S111 may be disposed on one side of the (11-1)-th channel CH111, and the (11-1)-th drain electrode D111 may be disposed on the other side of the (11-1)-th channel CH111. The (11-1)-th source electrode S111 may be connected to the (10-2)-th drain electrode D102 and may also be connected to the second connecting electrode through the tenth contact hole CNT10. The (11-1)-th drain electrode D111 may be connected to a (11-2)-th source electrode S112. The (11-1)-th source electrode S111 and the (11-1)-th drain electrode D111 may overlap with the scan control line GWL2 in the third direction (or the Z-axis direction).

The (11-2)-th transistor T112 of the eleventh transistor T11 may include a (11-2)-th channel CH112, a (11-2)-th gate electrode G112, a (11-2)-th source electrode S112, and a (11-2)-th drain electrode D112. The (11-2)-th channel CH112 may overlap with the (11-2)-th gate electrode G112 in the third direction (or the Z-axis direction). The (11-2)-th gate electrode G112 may be part of the third gate connecting electrode GCE3. The (11-2)-th source electrode S112 may be disposed on one side of the (11-2)-th channel CH112, and the (11-2)-th drain electrode D112 may be disposed on the other side of the (11-2)-th channel CH112. The (11-2)-th source electrode S112 may be connected to the (11-1)-th drain electrode D111, and the (11-2)-th drain electrode D112 may be connected to the initialization voltage line VIL through the seventh contact hole CNT7.

The twelfth transistor T12 may include a twelfth channel CH12, a twelfth gate electrode G12, a twelfth source electrode S12, and a twelfth drain electrode D12. The twelfth channel CH12 may overlap with the twelfth gate electrode G12 in the third direction (or the Z-axis direction). The twelfth gate electrode G12 may be part of the fifth gate connecting electrode GCE5. The twelfth source electrode S12 may be disposed on one side of the twelfth channel CH12, and the twelfth drain electrode D12 may be disposed on the other side of the twelfth channel CH12. The twelfth source electrode S12 may be connected to a fourteenth drain electrode D14 and may also be connected to the second power supply line VDL2 through a fourteenth contact hole CNT14. The twelfth drain electrode D12 may be connected to the eighth source electrode S8 and the ninth drain electrode D9.

The thirteenth transistor T13 may include a thirteenth channel CH13, a thirteenth gate electrode G13, a thirteenth source electrode S13, and a thirteenth drain electrode D13. The thirteenth channel CH13 may overlap with the thirteenth gate electrode G13 in the third direction (or the Z-axis direction). The thirteenth gate electrode G13 may be part of the seventh gate connecting electrode GCE7. The thirteenth source electrode S13 may be disposed on one side of the thirteenth channel CH13, and the thirteenth drain electrode D13 may be disposed on the other side of the thirteenth channel CH13. The thirteenth source electrode S13 may be connected to the eighth drain electrode and the (10-1)-th source electrode S101. The thirteenth drain electrode D13 may be connected to a sixteenth source electrode S16 and may also be connected to the fifth connecting electrode CCE5 through a twenty-seventh contact hole CNT27.

The fourteenth transistor T14 may include a fourteenth channel CH14, a fourteenth gate electrode G14, a fourteenth source electrode S14, and a fourteenth drain electrode D14. The fourteenth channel CH14 may overlap with the fourteenth gate electrode G14 in the third direction (or the Z-axis direction). The fourteenth gate electrode G14 may be part of the fifth gate connecting electrode GCE5. The fourteenth source electrode S14 may be disposed on one side of the fourteenth channel CH14, and the fourteenth drain electrode D14 may be disposed on the other side of the fourteenth channel CH14. The fourteenth source electrode S14 may be connected to the twelfth source electrode S12 and may also be connected to the second power supply line VDL2 through the fourteenth contact hole CNT14. The fourteenth drain electrode D14 may be connected to the third connecting electrode CCE3 through a twenty-fourth contact hole CNT24.

The fifteenth transistor T15 may include a fifteenth channel CH15, a fifteenth gate electrode G15, a fifteenth source electrode S15, and a fifteenth drain electrode D15. The fifteenth channel CH15 may overlap with the fifteenth gate electrode G15 in the third direction (or the Z-axis direction). The fifteenth gate electrode G15 may be part of the sixth gate connecting electrode GCE6. The fifteenth source electrode S15 may be disposed on one side of the fifteenth channel CH15, and the fifteenth drain electrode D15 may be disposed on the other side of the fifteenth channel CH15. The fifteenth source electrode S15 may be connected to the first power supply line VDL1 through the twenty-first contact hole CNT21. The fifteenth drain electrode D15 may be connected to the third connecting electrode CCE3 through a twenty-third contact hole CNT23.

The sixteenth transistor T16 may include a sixteenth channel CH16, a sixteenth gate electrode G16, a sixteenth source electrode S16, and a sixteenth drain electrode D16. The sixteenth channel CH16 may overlap with the sixteenth gate electrode G16 in the third direction (or the Z-axis direction). The sixteenth gate electrode G16 may be part of the sixth gate connecting electrode GCE6. The sixteenth source electrode S16 may be disposed on one side of the sixteenth channel CH16, and the sixteenth drain electrode D16 may be disposed on the other side of the sixteenth channel CH16. The sixteenth source electrode S16 may be connected to the thirteenth drain electrode D13 and may also be connected to the fifth connecting electrode CCE5 through the twenty-seventh contact hole CNT27. The sixteenth drain electrode D16 may be connected to the initialization voltage line VIL through a thirty-fifth contact hole CNT35.

The seventeenth transistor T17 may include a seventeenth channel CH17, a seventeenth gate electrode G17, a seventeenth source electrode S17, and a seventeenth drain electrode D17. The seventeenth channel CH17 may overlap with the seventeenth gate electrode G17 in the third direction (or the Z-axis direction). The seventeenth gate electrode G17 may be part of the eighth gate connecting electrode GCE8. The seventeenth source electrode S17 may be disposed on one side of the seventeenth channel CH17, and the seventeenth drain electrode D17 may be disposed on the other side of the seventeenth channel CH17. The seventeenth source electrode S17 may be connected to the sixth connecting electrode CCE6 through a thirty-second contact hole CNT32. The seventeenth drain electrode D17 may be connected to the third power supply line VSL through a thirty-fourth contact hole CNT34.

The first capacitor electrode CE1 of the first capacitor C1 may be integrally formed with the first gate electrode G1. The second capacitor electrode CE2 of the first capacitor C1 may overlap with the first capacitor electrode CE1 of the first capacitor C1 in the third direction (or the Z-axis direction). The second capacitor electrode CE2 may include a hole overlapping (e.g., overlapping in the third direction) or exposing the first gate electrode G1, and the first connecting electrode CCE1 may be connected to the first gate electrode G1 through the first contact hole CNT1, which penetrates (e.g., extends through) the hole of the second capacitor electrode CE2.

The second capacitor electrode CE2 of the first capacitor C1 may include an extension extending in the second direction (or the Y-axis direction. The extension of the second capacitor electrode CE2 may intersect the PWM emission line PWEL and the first power supply line VDL1. The extension of the second capacitor CE2 may be connected to the sweep line SWPL through a twentieth contact hole CNT20.

The first capacitor electrode CE3 of the second capacitor C2 may be integrally formed with the eighth gate electrode G8. A second capacitor electrode CE4 of the second capacitor C2 may overlap with the first capacitor electrode CE3 of the second capacitor C2 in the third direction (or the Z-axis direction). In one or more embodiments, the first capacitor electrode CE3 of the second capacitor C2 may be disposed in or at a same layer as the first capacitor electrode CE1 of the first capacitor C1, and the second capacitor electrode CE4 of the second capacitor C2 may be disposed in or at a same layer as the second capacitor electrode CE2 of the first capacitor C1. The second capacitor electrode CE4 may include a hole overlapping (e.g., overlapping in the third direction) or exposing the eighth gate electrode G8, and the second connecting electrode CCE2 may be connected to the eighth gate electrode G8 through the eleventh contact hole CNT11, which penetrates (e.g., extends through) the hole of the second capacitor electrode CE4.

The first gate connecting electrode GCE1 (e.g., the (3-2)-th gate electrode G32 of the first gate connecting electrode GCE1) may be connected to the scan write line GWL1 through a fifth contact hole CNT5. The second gate connecting electrode GCE2 (e.g., the (4-2)-th gate electrode G42 of the second gate connecting electrode GCE2) may be connected to the start scan initialization line GIL1 through a sixth contact hole CNT6. The third gate connecting electrode GCE3 may be connected to the repeat scan initialization line GIL2 through an eighth contact hole CNT8. The fourth gate connecting electrode GCE4 may be connected to the scan control line GWL2 through a ninth contact hole CNT9. The fifth gate connecting electrode GCE5 may be connected to the PWM emission line PWEL through a thirteenth contact hole CNT13. The sixth gate connecting electrode GCE6 may be connected to the repeat scan initialization line GIL2 through a seventeenth contact hole CNT17. The seventh gate connecting electrode GCE7 may be connected to the PAM emission line PAEL through a twenty-eighth contact hole CNT28. The eighth gate connecting electrode GCE8 may be connected to the test signal line TSTL through a thirty-third contact hole CNT33.

The first data connecting electrode DCE1 may be connected to the second source electrode S2 through the third contact hole CNT3 and to the data line DL through the fourth contact hole CNT4. The second data connecting electrode DCE2 may be connected to the ninth source electrode S9 through the fifteenth contact hole CNT15 and to the first PAM data line RDL through the sixteenth contact hole CNT16.

The first connecting electrode CCE1 may extend in the second direction (or the Y-axis direction). The first connecting electrode CCE1 may be connected to the first gate electrode G1 through the first contact hole CNT1 and to the (3-2)-th drain electrode D32 and the (4-1)-th source electrode S41 through the second contact hole CNT2.

The second connecting electrode CCE2 may extend in the second direction (or the Y-axis direction). The second connecting electrode CCE2 may be connected to the eighth gate electrode G8 through the eleventh contact hole CNT11 and to the (10-2)-th drain electrode D102 and the (11-1)-th source electrode S111 through the tenth contact hole CNT10.

The third connecting electrode CCE3 may be connected to the fifteenth drain electrode D15 through the twenty-third contact hole CNT23, to the fourteenth drain electrode D14 through the twenty-fourth contact hole CNT24, and to the second capacitor electrode CE4 of the second capacitor C2 through a twenty-fifth contact hole CNT25.

The fourth connecting electrode CCE4 may extend in the first direction (or the X-axis direction). The fourth connecting electrode CCE4 may be connected to the sixth drain electrode D6 through the twenty-ninth contact hole CNT29 and to the first capacitor electrode CE3 of the second capacitor C2 through a twenty-sixth contact hole CNT26.

The fifth connecting electrode CCE5 may be connected to the thirteenth drain electrode D13 and the sixteenth source electrode S16 through the twenty-seventh contact hole CNT27 and to the first anode connecting electrode ANDE1 through a thirtieth contact hole CNT30.

The sixth connecting electrode CCE6 may be connected to the seventeenth source electrode S17 through the thirty-second contact hole CNT32 and to the first anode connecting electrode ANDE1 through the thirty-second contact hole CNT32. The first anode connecting electrode ANDE1 may extend in the second direction (or the Y-axis direction).

The first vertical power supply line VVDL1 may extend in the second direction (or the Y-axis direction). The first vertical power supply line VVDL1 may be connected to the first power supply line VDL1 through a twenty-second contact hole CNT22.

The second vertical power supply line VVDL2 may extend in the second direction (or the Y-axis direction). The second vertical power supply line VVDL2 may be connected to the second power supply line VDL2 through a twelfth contact hole CNT12.

Referring to FIGS. 17 through 22, the display device may include a substrate SUB, a buffer layer BF, a first gate insulating film GI1, a second gate insulating film GI2, an interlayer insulating film ILD, a first via layer VIA1, a first passivation layer PAS1, a second via layer VIA2, a second passivation layer PAS2, a third via layer VIA3, a third passivation layer PAS3, and a fourth passivation layer PAS4.

The substrate SUB may support the display device. The substrate SUB may be a base substrate or a base member. The substrate SUB may be a flexible substrate that is bendable, foldable, or rollable. For example, the substrate SUB may include an insulating material such as a polymer resin (e.g., polyimide (PI)), but the present disclosure is not limited thereto. In another example, the substrate SUB may be a rigid substrate including a glass material.

The buffer layer BF may be disposed on the substrate SUB. The buffer layer BF may include an inorganic material capable of preventing or substantially preventing the infiltration of the air or moisture. The buffer layer BF may include a single inorganic film or a plurality of inorganic films that are alternately stacked. For example, the buffer layer BF may be a multilayer film in which one or more of a silicon nitride layer, a silicon oxynitride layer, a silicon oxide layer, a titanium oxide layer, and an aluminum oxide layer are alternately stacked.

An active layer may be disposed on the buffer layer BF. The active layer may include the first through seventeenth channels CH1 through CH17, the first through seventeenth source electrodes S1 through S17, and the first through seventeenth drain electrodes D1 through D17 of the first through seventeenth transistors T1 through T17. For example, the active layer may include polycrystalline silicon, monocrystalline silicon, low-temperature polycrystalline silicon, amorphous silicon, or an oxide semiconductor.

In another example, some of the first through seventeenth channels CH1 through CH17, some of the first through seventeenth source electrodes S1 through S17, and some of the first through seventeenth drain electrodes D1 through D17 may be disposed in a first active layer including polycrystalline silicon, monocrystalline silicon, low-temperature polycrystalline silicon, or amorphous silicon. The rest of the first through seventeenth channels CH1 through CH17, the rest of the first through seventeenth source electrodes S1 through S17, and the rest of the first through seventeenth drain electrodes D1 through D17 may be disposed in a second active layer including an oxide semiconductor.

The first through seventeenth channels CH1 through CH17 may overlap with the first through seventeenth gate electrodes G1 through G17, respectively, in the third direction (or the Z-axis direction). The first through seventeenth source electrodes S1 through S17 and the first through seventeenth drain electrodes D1 through D17 may include a silicon semiconductor or an oxide semiconductor doped with ions or impurities and may thus have conductivity.

The first gate insulating film GI1 may be disposed on the active layer. The first gate insulating film GI1 may insulate the first through seventeenth channels CH1 through CH17 from the first through seventeenth gate electrodes G1 through G17, respectively. The first gate insulating film GI1 may include an inorganic film. For example, the first gate insulating film GI1 may include one of a silicon nitride layer, a silicon oxynitride layer, a silicon oxide layer, a titanium oxide layer, and an aluminum oxide layer.

A first gate layer may be disposed on the first gate insulating film GI1. The first gate layer may include the first through seventeenth gate electrodes G1 through G17, the first capacitor electrode CE1 of the first capacitor C1, the first capacitor electrode CE3 of the second capacitor C2, and the first through eighth gate connecting electrodes GCE1 through GCE8.

The second gate insulating film GI2 may be disposed on the first gate layer. The second gate insulating film GI2 may insulate the first gate layer and a second gate layer. The second gate insulating film GI2 may include an inorganic film. For example, the second gate insulating film GI2 may include one of a silicon nitride layer, a silicon oxynitride layer, a silicon oxide layer, a titanium oxide layer, and an aluminum oxide layer.

The second gate layer may be disposed on the second gate insulating film GI2. The second gate layer may include the second capacitor electrode CE2 of the first capacitor C1 and the second capacitor electrode CE4 of the second capacitor C2.

The interlayer insulating film ILD may be disposed on the second gate layer. The interlayer insulating film ILD may insulate a first source metal layer and the second gate layer. The interlayer insulating film ILD may include an inorganic film. For example, the interlayer insulating film ILD may include one of a silicon nitride layer, a silicon oxynitride layer, a silicon oxide layer, a titanium oxide layer, and an aluminum oxide layer.

The first source metal layer may be disposed on the interlayer insulating film ILD. The first source metal layer may include the initialization voltage line VIL, the start scan initialization line GIL1, the repeat scan initialization line GIL2, the scan write line GWL1, the scan control line GWL2, the PWM emission line PWEL, the PAM emission line PAEL, the sweep line SWPL, the test signal line TSTL, the first power supply line VDL1, the gate-off voltage line VGHL, and the third power supply line VSL. The first source metal layer may include the first and second data connecting electrodes DCE1 and DCE2 and the first through sixth connecting electrodes CCE1 through CCE6.

The first via layer VIA1 may be disposed on the first source metal layer. The first via layer VIA1 may planarize the top of the first source metal layer.

The first passivation layer PAS1 may be disposed on the first via layer VIA1 to protect the first source metal layer. The first passivation layer PAS1 may include an inorganic film. For example, the first passivation layer PAS1 may include one of a silicon nitride layer, a silicon oxynitride layer, a silicon oxide layer, a titanium oxide layer, and an aluminum oxide layer.

A second source metal layer may be disposed on the first passivation layer PAS1. The second source metal layer may include the data line DL, the first vertical power supply line VVDL1, the second vertical power supply line VVDL2, the first PAM data line RDL, and the first anode connecting electrode ANDE1.

The second via layer VIA2 may be disposed on the second source metal layer. The second via layer VIA2 may planarize the top of the second source metal layer.

The second passivation layer PAS2 may be disposed on the second via layer VIA2 to protect the second source metal layer. The second passivation layer PAS2 may include an inorganic film. For example, the second passivation layer PAS2 may include one of a silicon nitride layer, a silicon oxynitride layer, a silicon oxide layer, a titanium oxide layer, and an aluminum oxide layer.

A third source metal layer may be disposed on the second passivation layer PAS2. The third source metal layer may include a first sub-power supply line VDL21. The first sub-power supply line VDL21 may be connected to the second vertical power supply line VVDL2 through a thirty-sixth contact hole CNT36, which penetrates the second passivation layer PAS2 and the second via layer VIA2.

The third via layer VIA3 may be disposed on the third source metal layer. The third via layer VIA3 may planarize the top of the third source metal layer.

The third passivation layer PAS3 may be disposed on the third via layer VIA3 to protect the third source metal layer. The third passivation layer PAS3 may include an inorganic film. For example, the third passivation layer PAS3 may include one of a silicon nitride layer, a silicon oxynitride layer, a silicon oxide layer, a titanium oxide layer, and an aluminum oxide layer.

A fourth source metal layer may be disposed on the third passivation layer PAS3. The fourth source metal layer may include a second sub-power supply line VDL22 and a first pixel electrode AND1.

An anode layer may be disposed on the fourth source metal layer. The anode layer may include a third sub-power supply line VDL23 and a second pixel electrode AND2. The third sub-power supply line VDL23 and the second pixel electrode AND2 may include a transparent metallic material such as a transparent conductive oxide (TCO) (e.g., indium tin oxide (ITO) or indium zinc oxide (IZO)).

The fourth passivation layer PAS4 may be disposed on the anode layer. The fourth passivation layer PAS4 may include an inorganic film. For example, the fourth passivation layer PAS4 may include one of a silicon nitride layer, a silicon oxynitride layer, a silicon oxide layer, a titanium oxide layer, and an aluminum oxide layer. The fourth passivation layer PAS4 may not cover part of the top surface of a pixel electrode AND. In one or more embodiments, the fourth passivation layer PAS4 may expose (e.g., expose through an opening of the fourth passivation layer PAS4) part of the top surface of a pixel electrode AND.

The light-emitting element ED may be disposed on part of the pixel electrode AND that may not be covered by the fourth passivation layer PAS4. In one or more embodiments, the light-emitting element ED may be disposed on part of the pixel electrode AND exposed through the opening of the fourth passivation layer PAS4. A contact electrode CAND may be disposed between the light-emitting element ED and the pixel electrode AND to connect (e.g., electrically connect) the light-emitting element ED and the pixel electrode AND.

The light-emitting element ED may be an inorganic LED. The light-emitting element ED may include a first semiconductor layer, an electronic blocking layer, an active layer, a superlattice layer, and a second semiconductor layer, which are sequentially stacked.

The first semiconductor layer may be disposed on the contact electrode CAND. The first semiconductor layer may be doped with a dopant of a first conductivity type such as magnesium (Mg), zinc (Zn), calcium (Ca), selenium (Se), or barium (Ba). For example, the first semiconductor layer may be p-GaN doped with Mg, which is a p-type dopant.

The electron blocking layer may be disposed on the first semiconductor layer. The electron blocking layer may be a layer for suppressing or preventing too many electrons from flowing into the active layer. For example, the electron blocking layer may be p-AlGaN doped with Mg, which is a p-type dopant. In one or more embodiments, the electron blocking layer may be omitted.

The active layer may be disposed on the electron blocking layer. As electron-hole pairs combine in accordance with electric signals applied through the first and second semiconductor layers, the active layer may emit light.

The active layer may include a material of a single- or multi-quantum well structure. In a case where the active layer includes a material of the multi-quantum well structure, the active layer may have a structure in which a plurality of well layers and a plurality of barrier layers are alternately stacked.

In one or more embodiments, the active layer may have a structure where a semiconductor material with a large bandgap energy and a semiconductor material with a small bandgap energy are alternately stacked or may include group-III to -V semiconductor materials depending on the wavelength range of light emitted by the active layer.

In a case where the active layer includes InGaN, the color of light to be emitted by the active layer may vary depending on the indium (In) content of the active layer. For example, as the In content of the active layer increases, the wavelength range of light emitted by the active layer may be switched to a red wavelength range, and as the In content of the active layer decreases, the wavelength of light emitted by the active layer may be switched to a blue wavelength range. For example, the In content of a light-emitting element ED of a third pixel SP3 may be about 15%, the In content of a light-emitting element ED of a second pixel SP2 may be about 25%, and the In content of a light-emitting element ED of a first pixel SP1 may be about 35% or greater. For example, the light-emitting elements ED of the first, second, and third pixels SP1, SP2, and SP3 may be made to emit first-color light, second-color light, and third-color light, respectively, by controlling the In content of the active layer.

The superlattice layer may be disposed on the active layer. The superlattice layer may be a layer for alleviating the stress between the second semiconductor layer and the active layer. For example, the superlattice layer may be formed of InGaN or GaN. In one or more embodiments, the superlattice layer may be omitted.

The second semiconductor layer may be disposed on the superlattice layer. The second semiconductor layer may be doped with a dopant of a second conductivity type such as silicon (Si), germanium (Ge), or tin (Sn). For example, the second semiconductor layer may be n-GaN doped with Si, which is an n-type dopant.

While the present disclosure has been particularly shown and described with reference to embodiments thereof, it will be understood by those of ordinary skill in the art that various changes in form and details may be made therein without departing from the spirit and scope of the present disclosure as set forth in the following claims, and their equivalents.

What is claimed is:

1. A display device comprising:

a first pixel driver connected to a scan write line, a sweep line, and a first data line, the first pixel driver to generate a control current based on a first data voltage received from the first data line;

a second pixel driver connected to a scan control line and a second data line, the second pixel driver to generate a driving current based on a second data voltage received from the second data line and to control a period for which the driving current flows, based on the control current; and a light-emitting element connected to the second pixel driver to receive the driving current, wherein the first pixel driver comprises:

a first transistor to generate the control current based on the first data voltage;

a second transistor to provide the first data voltage to a first electrode of the first transistor based on a scan write signal received from the scan write line; and a first capacitor comprising a first capacitor electrode connected to a gate electrode of the first transistor, and a second capacitor electrode connected to the sweep line, and wherein the second pixel driver comprises:

a third transistor to generate the driving current based on the control current; and a fourth transistor to provide the second data voltage to a first electrode of the third transistor based on a scan control signal received from the scan control line.

2. The display device of claim 1, wherein a sweep signal to be applied from the sweep line has a pulse that linearly decreases from a gate-off voltage to a gate-on voltage.

3. The display device of claim 1, further comprising a start scan initialization line and an initialization voltage line connected to the first pixel driver, wherein the first pixel driver further comprises:

a fifth transistor electrically connecting a second electrode of the first transistor and the gate electrode of the first transistor based on the scan write signal; and a sixth transistor electrically connecting the gate electrode of the first transistor and the initialization voltage line based on a start scan initialization signal received from the start scan initialization line.

4. The display device of claim 3, wherein the fifth transistor comprises a plurality of transistors connected in series between the second electrode of the first transistor and the gate electrode of the first transistor.

5. The display device of claim 3, wherein the sixth transistor comprises a plurality of transistors connected in series between the gate electrode of the first transistor and the initialization voltage line.

6. The display device of claim 3, further comprising a pulse width modulation (PWM) emission line and a first power supply line connected to the first pixel driver, wherein the first pixel driver comprises:

a seventh transistor electrically connecting the first power supply line and the first electrode of the first transistor based on a PWM emission signal received from the PWM emission line; and an eighth transistor electrically connecting the second electrode of the first transistor and a gate electrode of the third transistor based on the PWM emission signal.

7. The display device of claim 6, further comprising a repeat scan initialization line and a gate-off voltage line connected to the first pixel driver, wherein the first pixel driver further comprises a ninth transistor electrically connecting the gate-off voltage line and the second capacitor electrode based on a repeat scan initialization signal received from the repeat scan initialization line.

8. The display device of claim 1, further comprising a repeat scan initialization line and an initialization voltage line connected to the second pixel driver, wherein the second pixel driver further comprises:

a tenth transistor electrically connecting a second electrode of the third transistor and a gate electrode of the third transistor based on the scan control signal; and an eleventh transistor electrically connecting the gate electrode of the third transistor and the initialization voltage line based on a repeat scan initialization signal received from the repeat scan initialization line.

9. The display device of claim 8, wherein the tenth transistor comprises a plurality of transistors connected in series between the second electrode of the third transistor and the gate electrode of the third transistor.

10. The display device of claim 8, wherein the eleventh transistor comprises a plurality of transistors connected in series between the gate electrode of the third transistor and the initialization voltage line.

11. The display device of claim 8, further comprising a first power supply line connected to the second pixel driver, wherein the second pixel driver further comprises:

a twelfth transistor turned on based on the repeat scan initialization signal and comprising a first electrode connected to the first power supply line; and a second capacitor comprising a first capacitor electrode connected to the gate electrode of the third transistor, and a second capacitor electrode connected to a second electrode of the twelfth transistor.

12. The display device of claim 11, further comprising a PWM emission line and a second power supply line connected to the second pixel driver, wherein the second pixel driver further comprises a thirteenth transistor electrically connecting the second power supply line and the second capacitor electrode of the second capacitor based on a PWM emission signal received from the PWM emission line.

13. The display device of claim 12, further comprising a pulse amplitude modulation (PAM) emission line connected to the second pixel driver, wherein the second pixel driver further comprises:

a fourteenth transistor electrically connecting the second power supply line and the first electrode of the third transistor based on the PWM emission signal; and a fifteenth transistor electrically connecting the second electrode of the third transistor and a first electrode of the light-emitting element based on a PAM emission signal received from the PAM emission line.

14. The display device of claim 13, wherein the second pixel driver further comprises a sixteenth transistor electrically connecting the first electrode of the light-emitting element and the initialization voltage line based on the repeat scan initialization signal.

* * * * *